（12） United States Patent
Kadowaki et al.

(10) Patent No.: US 11,220,094 B2
(45) Date of Patent: Jan. 11, 2022

(54) FILM-LAMINATED METAL PLATE HAVING EXCELLENT RETORT ADHESIVENESS, AND METHOD FOR MANUFACTURING SAME

(71) Applicant: NIPPON STEEL & SUMITOMO METAL CORPORATION, Tokyo (JP)

(72) Inventors: Nobuo Kadowaki, Tokyo (JP); Yoichiro Mori, Tokyo (JP); Tadaaki Ochiai, Tokyo (JP); Akihiko Hirata, Tokyo (JP); Kazushi Iwakiri, Tokyo (JP); Tomohiro Mizutani, Tokyo (JP); Satoshi Kato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 497 days.

(21) Appl. No.: 16/082,756

(22) PCT Filed: Mar. 10, 2017

(86) PCT No.: PCT/JP2017/009804
§ 371 (c)(1),
(2) Date: Sep. 6, 2018

(87) PCT Pub. No.: WO2017/155113
PCT Pub. Date: Sep. 14, 2017

(65) Prior Publication Data
US 2019/0091985 A1    Mar. 28, 2019

(30) Foreign Application Priority Data

Mar. 10, 2016    (JP) .............................. JP2016-046897

(51) Int. Cl.
*B32B 37/08* (2006.01)
*B32B 37/06* (2006.01)
(Continued)

(52) U.S. Cl.
CPC .............. *B32B 37/08* (2013.01); *B29C 65/44* (2013.01); *B32B 15/08* (2013.01); *B32B 15/09* (2013.01);
(Continued)

(58) Field of Classification Search
CPC ..... B32B 37/08; B32B 15/08; B32B 37/0007; B32B 15/09; B32B 37/06; B32B 2250/02;
(Continued)

(56) References Cited

U.S. PATENT DOCUMENTS 6,200,409 B1 * 3/2001 Tanaka .................... B32B 15/08
156/309.9
6,221,301 B1 * 4/2001 Tsunashima .......... B29C 33/044
264/466

(Continued)

FOREIGN PATENT DOCUMENTS

EP    0730952 A2    9/1996
JP    61-149340 A    7/1986
(Continued)

OTHER PUBLICATIONS

Extended European Search Report for counterpart European Application No. 17763445.8, dated Oct. 4, 2019.
(Continued)

*Primary Examiner* — Cynthia L Schaller
(74) *Attorney, Agent, or Firm* — Birch, Stewart, Kolasch & Birch, LLP

(57) ABSTRACT

A film-laminated metal plate having excellent retort adhesiveness includes: a metal plate; a resin film thermally fusion-bonded to a surface of the metal plate; and a bubble contained between the metal plate and the resin film. An average bubble height of three bubbles with higher heights among the bubbles measured by using a 3D analysis image of a laser microscope is 0 μm or more and 5.0 μm or less. The
(Continued)

test piece is obtained by cutting a portion of one end side of the metal plate in a longitudinal direction while leaving the resin film on a side which becomes an inner surface side of the container when the film-laminated metal plate is processed into a container. When a retort treatment is carried out on the test piece at a temperature of 125° C. for 30 minutes in a state in which a 100 g weight is hung from the one end side of the test piece and the test piece is folded back toward the other end side of the test piece in the longitudinal direction by 180°, a length of the resin film peeled off from the metal plate of the test piece is 15 mm or less.

4 Claims, 4 Drawing Sheets

(51) Int. Cl.
*B32B 15/08* (2006.01)
*B65D 25/14* (2006.01)
*B29C 65/44* (2006.01)
*B32B 37/00* (2006.01)
*B65B 55/02* (2006.01)
*B32B 15/09* (2006.01)
*B65D 65/40* (2006.01)

(52) U.S. Cl.
CPC .......... *B32B 37/0007* (2013.01); *B32B 37/06* (2013.01); *B65B 55/02* (2013.01); *B65D 25/14* (2013.01); *B65D 65/40* (2013.01); *B32B 2250/02* (2013.01); *B32B 2439/00* (2013.01)

(58) Field of Classification Search
CPC .... B32B 2439/00; B65D 25/14; B65D 65/40; B29C 65/44; B65B 55/02; B65B 55/06
See application file for complete search history.

(56) References Cited

U.S. PATENT DOCUMENTS

| | | | |
|---|---|---|---|
| 6,663,940 | B1 | 12/2003 | Osame et al. |
| 2010/0310824 | A1 | 12/2010 | Oshima et al. |
| 2013/0326865 | A1* | 12/2013 | Kobayashi ............ H01M 4/139 29/623.1 |
| 2016/0009444 | A1* | 1/2016 | Nakagawa ................ B32B 1/00 206/524.2 |

FOREIGN PATENT DOCUMENTS

| | | |
|---|---|---|
| JP | 63-233824 A | 9/1988 |
| JP | 7-186353 A | 7/1995 |
| JP | 8-90717 A | 4/1996 |
| JP | 10-195210 A | 7/1998 |
| JP | 11-10796 A | 1/1999 |
| JP | 2000-158583 A | 6/2000 |
| JP | 2004-237549 A | 8/2004 |
| JP | 2004-358660 A | 12/2004 |
| JP | 2007-245441 A | 9/2007 |
| JP | 2009-184262 A | 8/2009 |
| TW | 200940327 A1 | 10/2009 |
| WO | WO 2014/132541 A1 | 9/2014 |

OTHER PUBLICATIONS

International Search Report for PCT/JP2017/009804 dated May 16, 2017.
Office Action for TW 106108055 dated Jul. 23, 2018.
Written Opinion of the International Searching Authority for PCT/JP2017/009804 (PCT/ISA/237) dated May 16, 2017.

* cited by examiner

FILM-LAMINATED METAL PLATE HAVING EXCELLENT RETORT ADHESIVENESS, AND METHOD FOR MANUFACTURING SAME

TECHNICAL FIELD OF THE INVENTION

The present invention relates to a film-laminated metal plate for a food container, and more particularly, to a film-laminated metal plate which has a small film peeling length and is effective for reducing bubbles harmful to can characteristics after canning, among bubbles present between a metal plate and a film, and a method for manufacturing the same.

Priority is claimed on Japanese Patent Application No. 2016-46897, filed on Mar. 10, 2016, the content of which is incorporated herein by reference.

RELATED ART

Regarding film-laminated metal plates, coated steel cans based on a steel plate that does not use Sn (chromium plated tinfree steel, TFS) prevail for food containers. However, in recent years, bisphenol A (hereinafter, BPA), which is a raw material of a coating, is regarded as an environmental hormone substance and the use thereof tends to be suppressed. Therefore, coating material manufacturers are developing BPA free coating materials for cans. However, since the BPA free coating materials have lower steel plate adhesion than BPA coating materials in the related art, it is difficult to say that the BPA free coating materials have sufficient corrosion resistance for all types of contents of current coated cans, and it is difficult to apply the BPA free coating materials to highly corrosive contents.

On the other hand, film laminate steel plates, which are being applied mainly to beverage cans, use polyester-based films and have no problem of BPA. In recent years, the film laminate steel plates are being applied to food cans and have attracted attention as a material for BPA free containers.

In the manufacturing of film-laminated metal plates, generally, films are pressure bonded to and thermally fusion-bonded to both surfaces of a heated metal plate by hard rubber rolls, and the films thermally fusion-bonded to the metal plate are firmly adhered to the metal plate and have very high corrosion resistance. However, when the films are pressure bonded by the rubber rolls while the heated metal plate passes at a high speed, there is a problem that bubbles are entrained along rugged structure of the metal plate.

A food container is subjected to a retort treatment for sterilization. In a film-laminated metal plate in a state in which many bubbles are entrained between a metal plate and a film, high pressure steam permeates into the film during the retort treatment and is accumulated in the bubble part, whereby the adhesion of the film decreases and the film is easily peeled off. In addition, with highly corrosive contents, corrosion is likely to initiate from the bubble part. Therefore, in order to further expand the applicable range of the film-laminated metal plate as a food container, it is necessary to reduce harmful bubbles present between the film and the steel plate to improve the adhesion of the film after the retort treatment (hereinafter, in some cases referred to as "retort adhesiveness").

For the purpose of preventing entrainment of air when a resin laminated steel plate is manufactured, Patent Document 1 describes a method for preventing entrainment of air during manufacturing of a laminated steel plate. The method is characterized in that when a sheet including a resin film and/or a metal foil or a preliminary laminate thereof is laminated on a steel strip, the sheet is fed toward the steel strip while the angle between the sheet and the steel strip is maintained at 30 to 90 degrees.

With the invention of Patent Document 1, it is possible to reduce entrainment of air when the steel strip and the resin film are pressure bonded to each other. However, it is difficult to prevent entrainment of some bubbles between the steel strip and the resin film when the steel strip and the resin film are laminated by bonding under pressure, and the bubbles between the steel strip and the resin film are not discharged in a subsequent passing step. Therefore, it is difficult to remove bubbles between the steel strip and the resin film only by the manufacturing method disclosed in Patent Document 1.

In Patent Document 2, it is described that entrainment of bubbles between a steel plate and a film can be reduced by laminating the film on a metal strip under reduced pressure. However, when the pressure of a space located on the upstream side of a pressing roll is reduced while the film is fed to a laminate roll, air is easily drawn between the laminate roll and the film from the outside of the reduced pressure space, so that it is difficult to prevent entrainment of bubbles.

When the pressure is reduced in a state in which bubbles are entrained, bubbles in the vicinity of the end portions of the film in its width direction easily escape, so that the adhered state of the laminate roll and the film at the end portions of the film in the width direction is improved. On the other hand, bubbles entrained in the vicinity of the center portion of the film in the width direction are less likely to escape. In addition, since the outer surface side of the film which does not contact with the laminate roll is reduced in pressure, bubbles are expanded, and when the film is pressed against the laminate roll in a state in which the bubbles are expanded, there is a problem that the bubbles burst and tend to become pinholes.

In addition, in a facility that continuously laminates films at a high speed, it is difficult to maintain the reduced pressure state of the space located on the upstream side of the pressing roll, and it is difficult to say that the method is realistic.

PRIOR ART DOCUMENT

Patent Document

[Patent Document 1] Japanese Unexamined Patent Application, First Publication No. S63-233824

[Patent Document 2] Japanese Unexamined Patent Application, First Publication No. H7-186353

DISCLOSURE OF THE INVENTION

Problems to be Solved by the Invention

In order to solve the above-described problems, the present invention provides a film-laminated metal plate having excellent retort adhesiveness with a small amount of bubbles having a harmful form to film adhesion, and a method for easily manufacturing the product.

Means for Solving the Problem

The inventors intensively studied a method for solving the above-described problems. As a result, it was found that harmful bubbles present between a film and a metal plate can be reduced by roll-pressure bonding the film to the metal plate heated to the melting point or higher of the film, thereafter starting cooling the metal plate within two seconds, and winding and passing the metal plate at least three or more times at a temperature of equal to or higher than the glass transition temperature (Tg) of a resin film and lower than the crystallization temperature with a passing tension of the laminate metal plate of 20 N/mm² or higher and 60 N/mm² or lower in a length range of 20% or more and 55% or less in terms of roll circumferential length ratio for each roll.

The harmful bubbles are bubbles present between the film of the film-laminated metal plate and the metal plate in which the average height of three bubbles with higher heights among the bubbles is more than 5 μm. It was found that by reducing the harmful bubbles, the film-laminated metal plate having improved retort adhesiveness required as a laminate metal plate and excellent can characteristics after canning can be obtained.

The present invention has been made on the basis of the above findings, and the gist thereof is as follows.

(1) A film-laminated metal plate having excellent retort adhesiveness according to an aspect of the present invention, including: a metal plate; a resin film thermally fusion-bonded to a surface of the metal plate; and a bubble between the metal plate and the resin film, in which an average bubble height of three bubbles with higher heights among the bubbles measured using a 3D analysis image of a laser microscope is 0 μm or more and 5.0 μm or less, a test piece is obtained by cutting a portion of one end side of the metal plate in a longitudinal direction while leaving the resin film on a side which becomes an inner surface side of the container when the film-laminated metal plate is processed into a container, and when a retort treatment is carried out on the test piece at a temperature of 125° C. for 30 minutes in a state in which a 100 g weight is hung from the one end side of the test piece and the test piece is folded back toward the other end side of the test piece in the longitudinal direction by 180°, a length of the resin film peeled off from the metal plate of a test piece is 15 mm or less.

(2) A method for manufacturing the film-laminated metal plate having excellent retort adhesiveness according to the aspect of the present invention is a method for manufacturing the film-laminated metal plate according to (1), includes: pressure bonding the resin film to the metal plate heated to a melting point or higher of the resin film with a film laminate roll; starting cooling the metal plate to a temperature range of equal to or higher than a glass transition temperature Tg and lower than a crystallization temperature Tc within 2.0 seconds after the pressure bonding; and in the temperature range, winding the metal plate at least three or more times in a length range of 20% to 55% in terms of roll circumferential length ratio for each roll and passing at a passing tension of film-laminated metal plate of 20 to 60 N/mm².

(3) In the method for manufacturing the film-laminated metal plate having excellent retort adhesiveness according to (2), the passing tension of film-laminated metal plate may be 40 to 60 N/mm².

(4) The method for manufacturing the film-laminated metal plate having excellent retort adhesiveness according to claim (2) or (3), at least one of diameters of the rolls around which the film-laminated metal plate winds may be 200 to 600 mm.

Effects of the Invention

According to the aspect of the present invention, compared to the manufacturing method in the related art, among bubbles entrained between the metal plate and the film, bubbles particularly harmful to retort adhesiveness and can characteristics can be reduced, so that the film peeling length after the retort treatment is reduced and the adhesion is improved. Therefore, corrosion caused by bubbles can be significantly reduced. Accordingly, the application range as the laminate metal plate particularly for a food container can be further expanded, and thus the effect is extremely large.

EMBODIMENTS OF THE INVENTION

Figure 1:
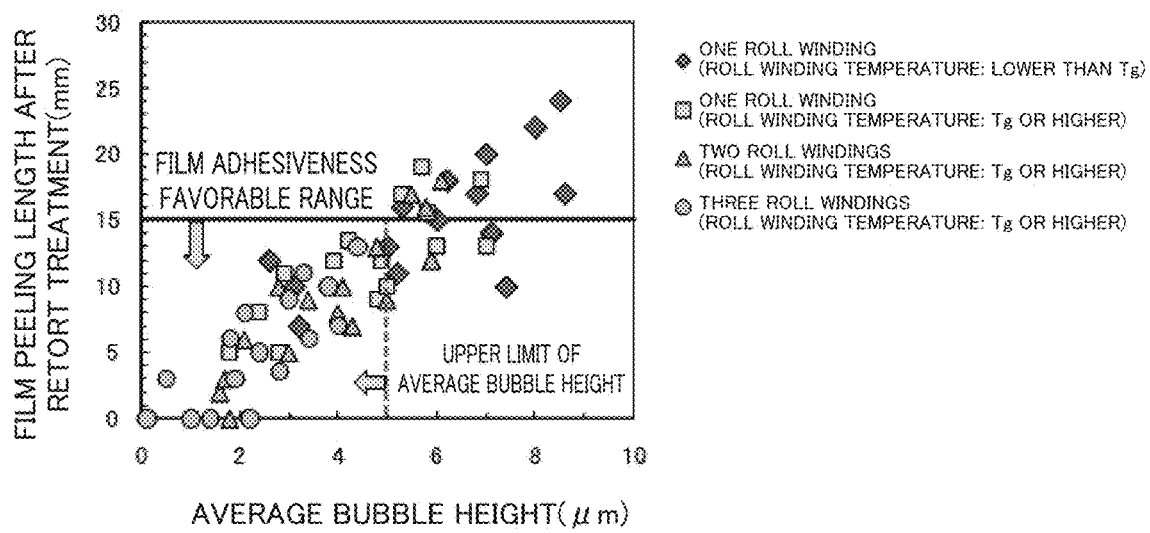
FIG. 1 is a view showing a relationship between a bubble height and a film peeling length after retort treatment.

A film-laminated metal plate 10 according to an embodiment of the present invention (a film-laminated metal plate according to this embodiment) will be described.

The film-laminated metal plate 10 according to this embodiment is characterized in that a peel length of a resin film 5 on a side which becomes the inner surface side of a container at least when processed into the container is 15 mm or less after being subjected to a retort treatment at 125° C. for 30 minutes in a state in which a 100 g weight is hung from one side of a 180° film peeling test piece having a width of 30 mm, and regarding a bubble 3 present between the resin film 5 and a metal plate 1, among bubble height measurement values obtained from a 3D analysis image of a laser microscope, the average measurement values of three bubbles with higher heights among bubbles is 0 μm or more and 5.0 μm or less.

Accordingly, the film-laminated metal plate 10 according to this embodiment has a smaller film peeling length after the retort treatment, improves adhesiveness, and can significantly reduce corrosion caused by the bubbles.

Hereinafter, the film-laminated metal plate 10 according to this embodiment and a method of manufacturing the same will be described in detail.

<Metal Plate 1>

The film-laminated metal plate 10 according to this embodiment includes a metal plate 1 for laminating the resin film 5. The metal plate 1 may be any of a tin plated steel plate, a chromium plated tinfree steel plate, a cold rolled steel plate, a stainless steel plate, an aluminum plate, a titanium plate, and the like, and is not particularly limited. However, from the viewpoint of food hygiene, workability, corrosion resistance, film adhesiveness, and material cost, the tin plated steel plate, or the chromium plated tinfree steel plate is suitable.

The plate thickness of the metal plate 1 is not particularly limited. However, when the metal plate 1 is too thin, workability decreases, which is not preferable. When the metal plate 1 is too thick, it is not economical, and cracking easily occurs at a bent portion in the film. Therefore, from these viewpoints, the plate thickness of the metal plate 1 is preferably 0.12 mm or more and 0.40 mm or less.

The surface roughness of the metal plate 1 is not particularly limited. However, in a case where the surface roughness of the metal plate 1 is less than 0.05 µm in terms of the arithmetic average roughness Ra specified in JIS B 0601, when the resin film 5 is laminated on the metal plate 1 by pressure bonding, if a bubble 3 is entrained between the metal plate 1 and the resin film 5, the bubble 3 is less likely to escape. On the other hand, in a case where the surface roughness of the metal plate 1 exceeds 0.8 µm in terms of the average roughness Ra, when the resin film 5 is laminated on the metal plate 1 by pressure bonding, bubbles are likely to be entrained along the rugged structure of the surface of the metal plate 1.

Therefore, the surface roughness of the metal plate 1 is preferably in a range of 0.05 µm or more and 0.8 µm or less in terms of the average roughness Ra. More preferably, the surface roughness of the metal plate 1 is 0.1 µm or more and 0.6 µm or less.

The metal plate 1 may be further subjected to a surface treatment on the surface of the metal plate 1 described above. For example, for the purpose of improving the adhesion between the metal plate 1 and the resin film 5, a chemical treatment film (not illustrated) comprising O, one or more elements selected from Cr, Zr, Al, Si, P, Ti, Ce, and W, and unavoidable components may be formed on the surface of the metal plate 1 which becomes the inner surface side of a canned product. A chemical treatment film (not illustrated) comprising hydroxides and oxides of the above elements has a hydroxyl group and thus forms a hydrogen bond with a hydroxyl group of a polyester resin. Therefore, the adhesion between the metal plate 1 and the resin film 5 is improved.

As a method for forming the chemical treatment film (not illustrated) containing one or more elements selected from Cr, Zr, Al, P, Ti, Ce, and W, a method of carrying out an electrolytic treatment on an aqueous solution of fluoride, nitrate, sulfate, chloride, acetate, formate, carbonate of various elements, a method utilizing an etching reaction by immersion, and the like can be employed. After chemical treatment, most of counter ions of the above elements are removed from the chemical treatment film (not illustrated) by washing with water or hot water, but a small amount may remain as unavoidable components in some cases. The counter ions as the unavoidable components may be present as long as the counter ions are in a range in which the characteristics of the chemical treatment film are not affected.

The metal plate 1 may have a film (not illustrated) formed by a silane coupling agent treatment or the like other than the chemical treatment film (not illustrated). The film (not illustrated) formed by the silane coupling agent treatment contains a Si compound and thus has excellent adhesiveness between the metal plate 1 and the resin film 5, which is preferable.

<Resin Film 5>

The film-laminated metal plate 10 according to this embodiment includes the resin film 5 on the surface of the metal plate 1.

As the resin film 5, a polyester-based film is preferable because of its excellent workability, adhesiveness, corrosion resistance, hygiene, and flavor retentivity.

The polyester-based film may be a stretched film or a non-stretched film, and is not particularly limited. However, the stretched film is more preferable because the stretched film is superior to the non-stretched film in corrosion resistance and strength and is cheaper than the non-stretched film.

The resin forming the polyester-based film may be, for example, a polyester copolymer mainly containing an ethylene terephthalate unit and containing, as a copolymerization component other than the ethylene terephthalate unit, an ethylene isophthalate unit or butylene terephthalate unit, or may be a mixture of polyethylene terephthalate and a polyethylene terephthalate-isophthalate copolymer or a polyethylene terephthalate-butylene terephthalate copolymer.

Regarding the ratio between an ethylene terephthalate and an ethylene isophthalate unit, it is preferable that the ethylene isophthalate unit is 12 mol % of the entire polyester-based film. In a case where the ratio of the ethylene isophthalate unit to the polyester-based film exceeds 12 mol %, the crystallinity of an oriented layer decreases, so that the moisture permeability of the film increases, which in some cases leads to a decrease in corrosion resistance.

The resin film 5 may be a single layer or a multilayer structure of two layers or three layers. In the case of the multilayer structure, the resin kinds of the respective layers may be different from each other.

The molecular weight of a polyester-based resin has a good correlation with the inherent viscosity (IV), and the molecular weight is generally controlled by the inherent viscosity. Therefore, it is preferable that the inherent viscosity (IV) as a control value corresponding to the molecular weight of the polyester film is set to be in an appropriate range. Specifically, when the inherent viscosity (IV) of the polyester-based film is 0.30 dl/g of more, the strength and elongation of the resin are high, which is preferable. The inherent viscosity (IV) is measured using a solution prepared by dissolving the resin in a concentration of 0.5% in an o-chlorophenol solvent at 25° C. and is obtained by Expression (i) below.

$$\text{Inherent viscosity} = \{\ln(t/t0)\}/C \qquad (i)$$

where C represents the concentration represented by the number of grams of the resin per 100 ml of the solution, t0 represents the flowing time (unit: second) of the solvent, and t represents the flowing time (unit: second) of the solution.

The glass transition temperature of the resin film 5 is preferably 50° C. or higher, and more preferably in a range of 60° C. to 90° C. from the viewpoint of preventing elution of an oligomer component into the content.

The thermal shrinkage ratio of the resin film 5 is preferably 15% or less. In a case where the thermal shrinkage ratio exceeds 15%, in an application to a can in which the can body portion is subjected to a printing and baking treatment after canning, there may be cases where the film peels off at the flange portion, which is not preferable. In a case where the thermal shrinkage ratio exceeds 15%, in an application in which a retort sterilization treatment is carried out at a high temperature, the film adhesiveness may decrease and peeling may occur at the time of retort treatment, which is not preferable.

The thickness of the resin film 5 is preferably 8 µm or more and 30 µm or less. In a case where the thickness of the resin film 5 is less than 8 µm, corrosion resistance is insufficient depending on the content, and there may be cases the resin film 5 is cracked during processing of a container or the like, which is not preferable. On the other hand, in a case where the thickness of the resin film 5 exceeds 30 µm, the thickness of the oriented layer becomes relatively thick compared to a fused amorphous layer on the metal plate 1, so that the shrinkage force after forming and the retort treatment becomes strong and the resin film 5 peels off in some cases, which is not preferable.

The elongation of the resin film 5 is preferably 100% or more.

In a case where the elongation of the resin film 5 is less than 100%, when the film-laminated metal plate 10 is processed into a can or a can lid, there may be cases the surface of the resin film 5 is cracked at a portion with a small bend radius. This crack becomes a starting point of corrosion particularly on the lid inner surface side and is thus not preferable.

In addition, even when inorganic particles such as silica are mixed and dispersed in the resin film 5 for the purpose of preventing blocking, the effect of the present invention is not impaired.

<Film-Laminated Metal Plate 10>

The inventors intensively studied the relationship between the bubble 3 and the film adhesiveness, and the following was discovered. FIG. 1 shows the influence of on the number of times the metal plate 1 having the resin film 5 laminated thereon winding around pass line conveying rolls on the relationship between an average bubble height and a film peeling length after retort treatment.

In particular, it was found that even when rolling with two pairs of rolls is not performed for reduction, as described later, by setting the number of times the resin film 5 after being laminated in a temperature range of a glass transition temperature (Tg) or higher and lower than a film crystallization temperature (Tc) winding around the pass line conveying rolls to three or more, the average bubble height can be reduced, and with a reduced average bubble height, the film peeling length after retort treatment can be improved. In particular, when the average bubble height is 0 µm or more and 5.0 µm or less, a film peeling length after retort treatment of 15 mm or less, by which good film adhesiveness is determined in general, can be achieved.

When the temperature of the metal plate 1 winding around the rolls after the lamination is higher than the crystallization temperature (Tc) of the resin film 5, in addition to the suppression of air permeation due to the progress of crystallization, the rigidity of the resin film 5 decreases. Therefore, there may be cases where the bubble height increases due to the expansion of the air in the bubble 3. Accordingly, the upper limit of the plate temperature winding around the rolls is preferably lower than the crystallization temperature (Tc) of the film. In addition, when the plate temperature at which the metal plate 1 to which the resin film 5 is thermally fusion-bonded winds around the rolls is lower than the glass transition temperature (Tg) of the resin film 5, the resin hardens and the air in the bubble 3 hardly permeates, so that the height of the bubble 3 does not decrease as described above. Therefore, the lower limit of the plate temperature during the winding around the rolls is preferably equal to or higher than the glass transition temperature (Tg) of the resin film 5.

In a case where the number of times of winding around the rolls is two or less, the diffusion time of the air in the bubble 3 is insufficient as described above. Therefore, there are still many bubbles 3 having a high bubble height (the average bubble height of three bubble with higher heights among bubbles). Accordingly, the number of times of winding around the rolls is preferably three or more.

In particular, in a case where the average bubble height of three bubbles with higher heights among bubbles exceeds 5.0 µm, when bubbles 3 with a high bubble height are adjacent to each other, moisture permeates between the bubbles 3, and this significantly decreases the adhesion between the resin film 5 and the metal plate 1 after the retort treatment, which is not preferable. Furthermore, when the height of the bubble 3 is high, the convex portion of the bubble 3 is damaged due to sliding on a die during canning, and this increases the risk of film defects such as flaws, which is not preferable.

For the above reasons, it is preferable that the average height of three bubble with higher heights among the bubbles 3 present between the resin film 5 and the metal plate 1 (average bubble height) is 0 µm or more and 5.0 µm or less. In addition, when the die slides on the surface of the resin film 5 during canning, the vicinity of the apex of the bubble 3 is easily damaged. When the degree of damage of the bubble 3 is large, film pinholes are easily formed, and this becomes the cause of poor corrosion resistance, which is not preferable.

In the above description, the lower limit of the average bubble height is set to 0 µm or more. However, when the lower limit is 2 µm or more, suitable retort adhesiveness for practical use can be obtained. Therefore, the average bubble height may be 2 µm or more and 5.0 µm or less.

Figure 2:
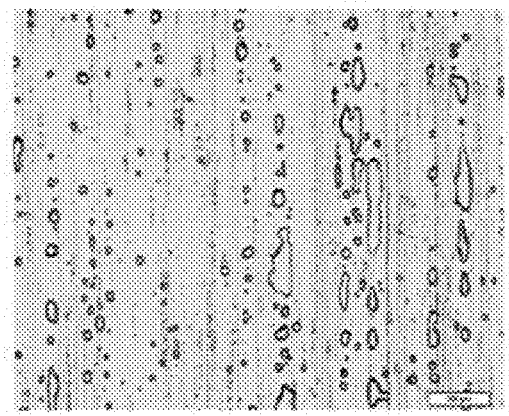
FIG. 2 is an example of a photograph of the external appearance of a bubble distribution of a film-laminated metal plate in a case of winding around a roll once (Tg or higher), and is a view showing the number of times of roll winding after a film is pressure bonded by the roll and a bubble generation state (bubble area and number distribution of bubbles generated)
Figure 3:
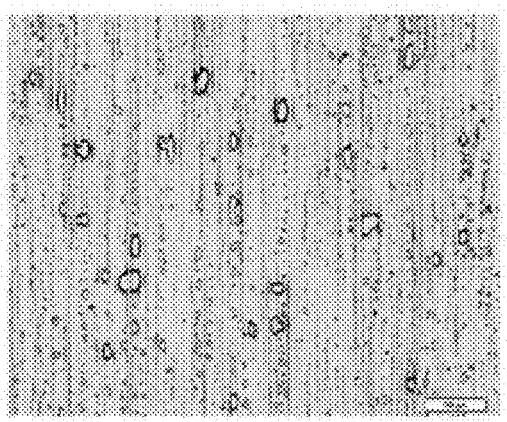
FIG. 3 is an example of a photograph of the external appearance of a bubble distribution of the film-laminated metal plate in a case of winding around rolls three times (Tg or higher).

FIGS. 2 and 3 show the results of observation of bubbles 3 in an actual film-laminated metal plate 10.

It can be seen that compared to the state of the bubbles 3 in a case of winding around the rolls once at the glass transition temperature (Tg) or higher of the resin film 5 as shown in FIG. 2, the size and number of bubbles 3 decrease in a case of winding around the rolls three times at the glass transition temperature (Tg) of the resin film 5 or higher as shown in FIG. 3.

Although the improvement in the film peeling length after retort treatment due to the reduced number of bubbles can be presumed from these photographs, the improvement in the film peeling length after retort treatment due to the reduced average bubble height as shown in FIG. 1 cannot be determined.

Figure 4:
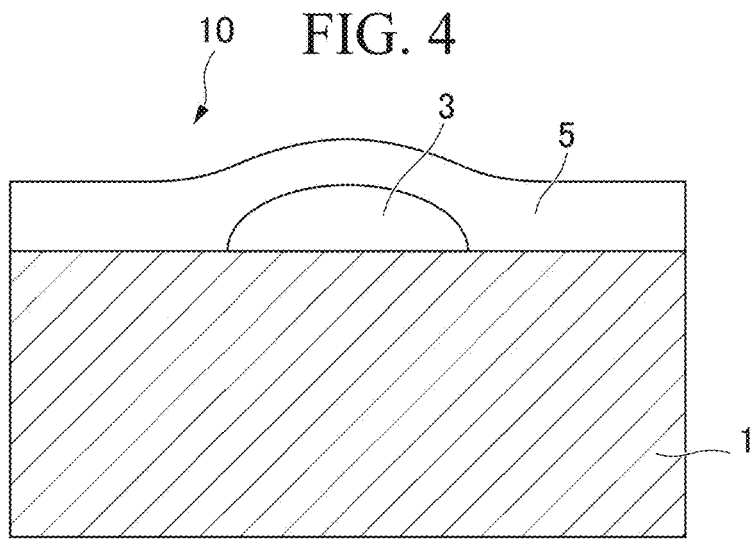
FIG. 4 is a schematic view of the cross-sectional shape of a bubble of the film-laminated metal plate.

The reason why the average bubble height affects the film peeling length after retort treatment is that when a bubble 3 having a high average bubble height is present, as shown in the schematic sectional view of the shape of the bubble in FIG. 4, water vapor easily permeates into the bubble 3 from a thinner portion of the resin film 5 in the vicinity of the apex of the bubble 3, moisture intrudes into the interface between the resin film 5 and the metal plate 1 in the vicinity of the bubble 3, and thus the adhesion of the resin film 5 is likely to decrease. Therefore, it is presumed that the bubble height is also greatly related to adhesiveness.

Regarding the measurement of the heights of the bubbles 3, in order to eliminate error due to measurement position, it is preferable that samples of about 10 mm×10 mm are cut and taken from three random points in a sample of the film-laminated metal plate 10 of about 20 cm in width×30 cm in length, an image of about 10 visual fields (0.3525 mm$^2$ for each visual field, a total visual field area of 3.525 mm$^2$ for 10 visual fields) is taken at a magnification of 200-fold (visual field: 0.50 mm in length×0.705 mm in width) for a resin film surface of each of the samples, the bubble height of bubbles 3 having the highest height in the respective visual fields is measured by the bubble height measurement method described above, and the average value of the highest three bubble heights is calculated for the measured 10 visual fields and is used as the average bubble height.

In the bubble height measurement, the profile of the surface of the resin film 5 of the film-laminated metal plate 10 at a resolution of 0.1 μm or less is measured using a 3D profile measuring function of a laser microscope. Next the cross-sectional profile of the surface of the bubble 3 through image analysis processing is extracted, Aline is drawn perpendicular to the baseline drawn between both ends of the bubble 3, from the apex of the bubble 3 in cross-sectional profile, and the bubble height can be measured by analyzing the length of line from the apex of the bubble 3 to the baseline.

Figure 5A:
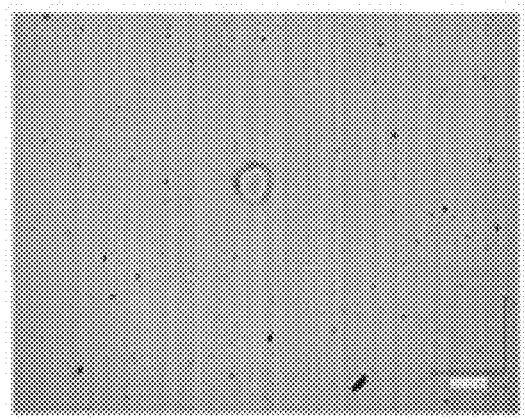
FIG. 5A shows a result of observation of a bubble by a laser microscope.
Figure 5B:
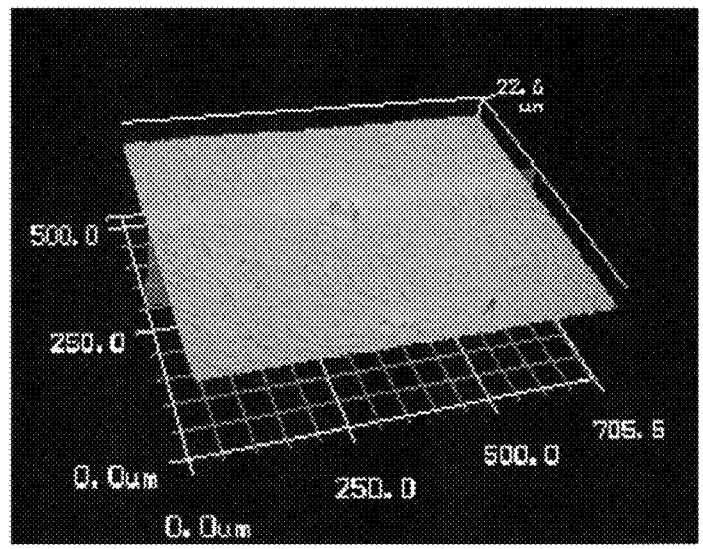
FIG. 5B is an example of a 3D profile image of the bubble by the laser microscope.
Figure 5C:
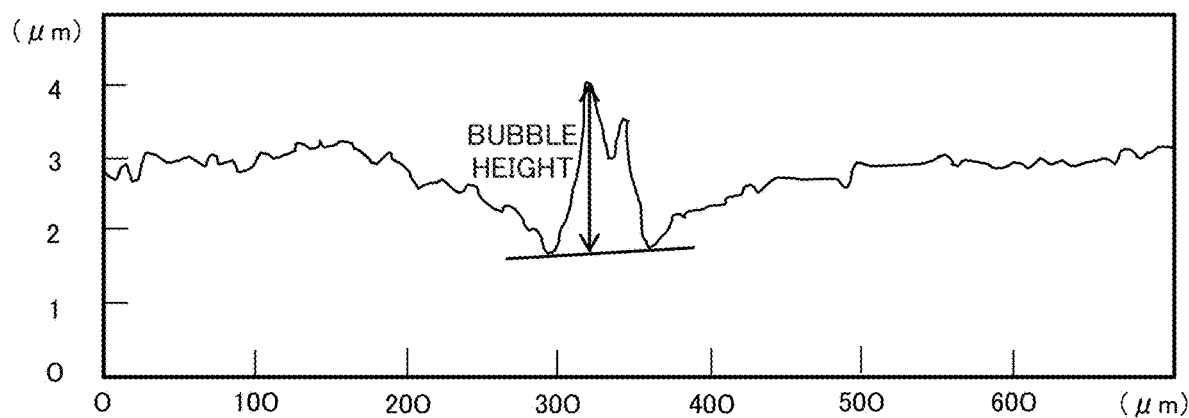
FIG. 5C is an example of extracting a cross section profile of the bubble from the laser microscope 3D profile image and analyzing a bubble height.

The summary of the measurement will be described with reference to FIGS. 5A to 5C. FIG. 5A is an example of a photograph of the external appearance of the bubble 3, FIG. 5B is an example of a laser microscope 3D profile image of the bubble 3, and FIG. 5C is an example of analyzing the bubble height by extracting the cross-sectional profile of the bubble 3 from the laser microscope 3D profile image.

<Method for Manufacturing Film-Laminated Metal Plate 10>

A method for manufacturing the film-laminated metal plate 10 having an average bubble height of 0 μm or more and 5.0 μm or less will be described below in detail.

Figure 6:
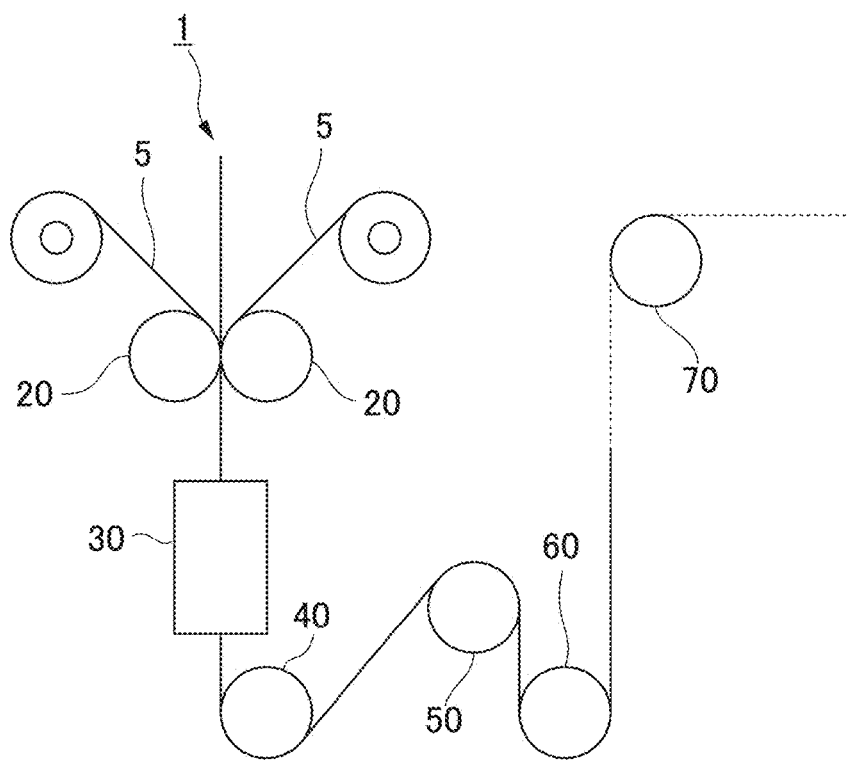
FIG. 6 is a schematic view showing a method for manufacturing a film-laminated metal plate according to an embodiment of the present invention.

First, FIG. 6 shows a schematic diagram of the method for manufacturing the film-laminated metal plate 10. As shown in FIG. 6, for example, a method of pressure bonding resin films 5 to a known metal plate 1 heated by a heating roll (not illustrated) by a pair of film laminate rolls 20 to thermally fusion-bond the resin films 5 thereto, subsequently cooling a film-laminated metal plate 10 to a predetermined temperature in a cooling tank 30, and thereafter winding the film-laminated metal plate 10 around rolls (a first roll 40, a second roll 50, and a third roll 60) enables formation of a uniform film layer structure in width and length directions and a reduction in the bubble 3 entrained between the metal plate 1 and the resin film 5 and is thus preferable.

As a method of heating the metal plate 1, a method of heating a metal plate by passing the metal plate through a jacket roll that passes a plurality of heat media such as steam through the inside of the roll or a heating roll having a heater embedded therein is preferable because the metal plate can be uniformly and stably heated in the width direction and the length direction.

As the film laminate roll 20, a rubber roll is preferable because an appropriate nip length can be secured at a film laminate portion. As the material of the rubber roll, rubber having high heat resisting properties such as fluorine rubber and silicone rubber is particularly preferable.

In the above-described method, it is preferable that after the resin film 5 is thermally fusion-bonded to the metal plate 1, the film-laminated metal plate 10 is immediately cooled to a temperature lower than the crystallization temperature of the polyester-based film by a method such as water cooling, air-water cooling, or cold air. However, when cooling to a temperature lower than the glass transition temperature (Tg) is carried out, it becomes difficult for the molecules of the resin to undergo thermal movement, the resin becomes hard, and it becomes difficult for the bubble 3 entrained between the metal plate 1 and the resin film 5 to permeate between the molecules of the resin film 5 and escape when the resin film 5 is laminated on the metal plate 1, which is not preferable. In a case where the plate temperature after cooling is equal to or higher than the crystallization temperature (Tc) of the resin film 5, crystallization of the resin film 5 proceeds, the density of the resin film 5 increases, and the bubble 3 entrained between the metal plate 1 and the resin film 5 is less likely to escape, which is not preferable.

Therefore, it is preferable that during cooling after thermal fusion-bonding of the resin film 5 to the metal plate 1, the plate temperature is maintained at a temperature of equal to or higher than the glass transition temperature (Tg) of the resin film 5 and lower than the crystallization temperature (Tc) of the resin film 5.

It is preferable that the time for starting cooling to a temperature of equal to or higher than the glass transition temperature (Tg) of the resin film 5 and lower than the crystallization temperature (Tc) after the thermal fusion-bonding of the resin film 5 to the metal plate 1 is 2.0 seconds or shorter. In a case of the polyester-based film, when the time until the temperature becomes lower than the crystallization temperature (Tc) after the thermal fusion-bonding of the resin film 5 to the metal plate 1 exceeds 2.0 seconds, a fused amorphous phase which is thermally fusion-bonded starts to form spherulite, so that the diffusion speed of the gas in the film layer decreases and the bubble 3 entrained between the metal plate 1 and the resin film 5 is less likely to escape, which is not preferable. Cooling includes actively cooling using a cooling medium and also includes air cooling as long as a time of 2.0 seconds or less until a temperature of lower than the crystallization temperature (Tc) is satisfied.

The present invention is characterized in that in order to reduce the bubbles 3, as described above, in a state in which the resin film 5 is retained in a temperature range of equal to or higher than the glass transition temperature (Tg) and lower than the crystallization temperature (Tc) of the film, the film-laminated metal plate 10 winds around the rolls to be passed, at least three or more times in a length range of 20% or more and 55% or less in terms of roll circumferential length ratio for each roll in the above temperature range.

The reason for this is to apply pressure to the surface of the resin film 5 of the film-laminated metal plate 10. There is also a method of rolling the film surfaces by sandwiching the front and rear surfaces of the film-laminated metal plate 10 between rolls. However, the contact time between the rolls and the film-laminated metal plate 10 is short and the time for diffusion of the bubble 3 is not obtained, which is not preferable. Furthermore, since a large apparatus including a rolling device in the facility is formed, it becomes difficult to secure a time of 2.0 seconds or shorter for cooling to a temperature of lower than the crystallization temperature (Tc) described above and a temperature range of equal to or higher than the glass transition temperature (Tg) and lower than the crystallization temperature (Tc) of the film, which is not preferable.

In addition, as a method other than the rolls, a method of applying pressure to the front and rear surfaces of the film-laminated metal plate 10 by hot pressing is conceivable. However, it is practically difficult to continuously interpose the film-laminated metal plate 10 that moves at a high speed between hot presses. Even regarding the number of times of winding, it is difficult to apply an unnecessary high tension to the film-laminated metal plate 10 by a single winding even from the tension specification of an existing laminated metal plate manufacturing facility, or a considerable facility remodeling is required, which is not preferable.

In consideration of easy achievement of high speed passing performance, a method of applying tension by winding the film-laminated metal plate 10 around the rolls requires a simple facility, and even from the viewpoint of securing a passing pass line after lamination, and the most preferable method is to arrange rolls as conveying rolls in a temperature range of equal to or higher than the glass transition temperature (Tg) and lower than the crystallization temperature (Tc) of the resin film 5 and perform winding around the rolls to secure a reduction.

The present invention is characterized in that in order to reduce the bubbles 3 furthermore, as described above, winding and passing is performed at least three or more times in a length range of 20% or more and 55% or less in terms of roll circumferential length ratio for each roll in the above temperature range. The reason for at least three or more times is as shown in FIG. 1 described above. At least three or more times passing are at least three times passing in the above temperature range and the roll circumferential length ratio, about one to three pass line rolls that contact with the film-laminated metal plate may be present between the three times passing without satisfying the roll circumferential length ratio.

Regarding the point of winding in a length range of 20% or more and 55% or less in terms of roll circumferential length ratio for each roll, when a contact length of the metal plate 1 and the roll is about ¼ to half of the roll circumferential length, pressure is easily applied in a direction perpendicular to the bubble 3 at the time of applying tension to the film-laminated metal plate 10. Therefore, it is preferable to bring the film-laminated metal plate 10 into contact with the roll in a length range of 20% or more and 55% or less in terms of roll circumferential length ratio, and this does not cause a significant facility remodeling, which is preferable.

In addition, in a step of winding the film-laminated metal plate 10 around the rolls which is cooled to a temperature of equal to or higher than the glass transition temperature (Tg) of the resin film 5 and lower than the crystallization temperature of the resin film 5 in the cooling tank 30 of a film laminating apparatus, for the purpose of suppressing a temperature decrease in the film-laminated metal plate 10, a heating furnace or a heat insulating tank may be provided between the rolls.

In addition, as the material of the roll surface, hard rubber, ceramic, or the like having low thermal conductivity is preferable because the temperature decrease is small when the film-laminated metal plate 10 winds around the roll. Alternatively, for the purpose of suppressing the temperature decrease when the film-laminated metal plate 10 winds around the rolls, a jacket roll capable of controlling the temperature of the roll surface by heating the inside of the roll with a heating medium or a heater may be employed.

Figure 7:
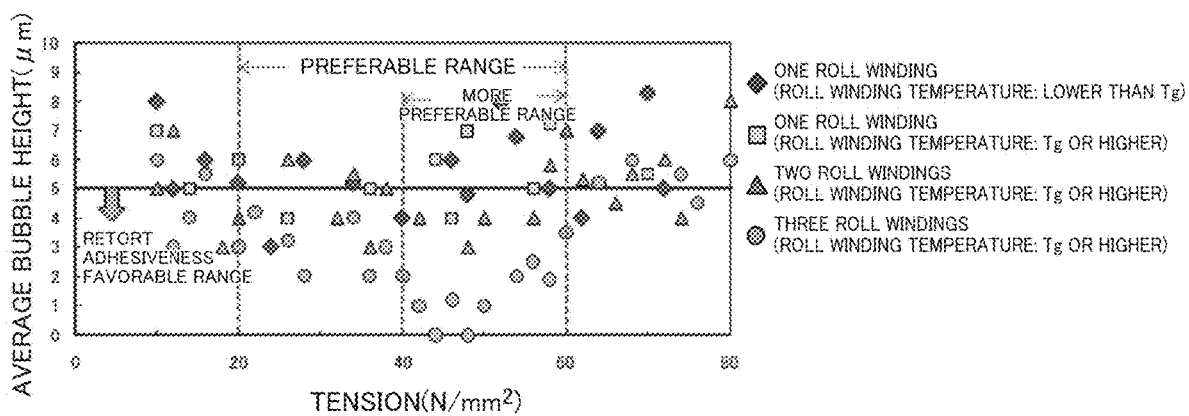
FIG. 7 is a view showing a relationship between a tension of the laminate metal plate and an average bubble height (the average bubble height of three bubbles with higher heights among the bubbles) of the film-laminated metal plate.

Furthermore, after pressure bonding the resin film 5 to the metal plate 1 heated to the melting point or higher of the resin film 5 by the film laminate roll, when the metal plate 1 is in a temperature range of equal to or higher than the glass transition temperature (Tg) of the resin film 5 and lower than the crystallization temperature (Tc), as illustrated in FIG. 7, by winding the film-laminated metal plate 10 around the rolls three or more times at a passing tension of 20 N/mm$^2$ or higher and 60 N/mm$^2$ or lower, the average bubble height can be stabilized to 5 μm or less.

In a case where the tension of the film-laminated metal plate 10 winding around the roll is less than 20 N/mm$^2$, the pressure applied in the plate thickness direction of the film-laminated metal plate 10 decreases, and the bubble 3 is less likely to escape, which causes larger variation in bubble heights and is thus not preferable. In addition, when the tension of the film-laminated metal plate 10 exceeds 60 N/mm$^2$, the rolling force is too high, and there may be cases where the bubble 3 expands when the film-laminated metal plate 10 is separated from the roll, which rather causes larger variation in bubble heights and is thus not preferable. More preferably, when the passing tension of the film-laminated metal plate 10 is 40 N/mm$^2$ or higher and 60 N/mm$^2$ or less, the average bubble height is further stabilized at a lower level.

This is because by applying tension to the film-laminated metal plate 10, a vertical pressure is applied to a portion of the film-laminated metal plate 10 winding around the roll, and the bubbles 3 are pressed from an upward direction, which promotes the diffusion of the air in the bubble 3. Simultaneously, the bubble heights decrease as the bubbles 3 are pressed. From the relationship with the temperature range, it can be seen that the average bubble height further decreases when the passing tension of the film-laminated metal plate 10 is in a range of 40 N/mm$^2$ or more and 60 N/mm$^2$ or less, and variation thereof further decreases.

Regarding the diameter of the roll wound and passed at least three or more times, in a case where the diameter of the roll around which the film-laminated metal plate 10 winds is less than 200 mm, the time for which the film-laminated metal plate 10 contacts with the roll is short, and the bubble 3 is less likely to escape, which is not preferable. When the diameter of the roll exceeds 600 mm, the area of the film-laminated metal plate 10 in contact with the roll increases, so that the pressure applied to unit area in the plate thickness direction decreases and the bubble 3 is less likely to escape, which is not preferable.

As described above, by securing an appropriate roll circumferential length ratio and the number of times of winding in an appropriate temperature range while securing a pass line after lamination, and further preferably securing an appropriate tension, air molecules in the bubble 3 diffuse into the resin film 5 and gradually decrease, a mechanical pressure is applied to the surface of the resin film 5 of the film-laminated metal plate 10 at this time, and the diffusion of the air molecules in the bubble 3 into the resin film 5 is promoted such that the volume of the bubble 3 decreases, the number of bubbles 3 decreases, the individual bubble heights decreases, and the retort adhesiveness of the resin film 5 is improved, which is preferable.

Figure 8:
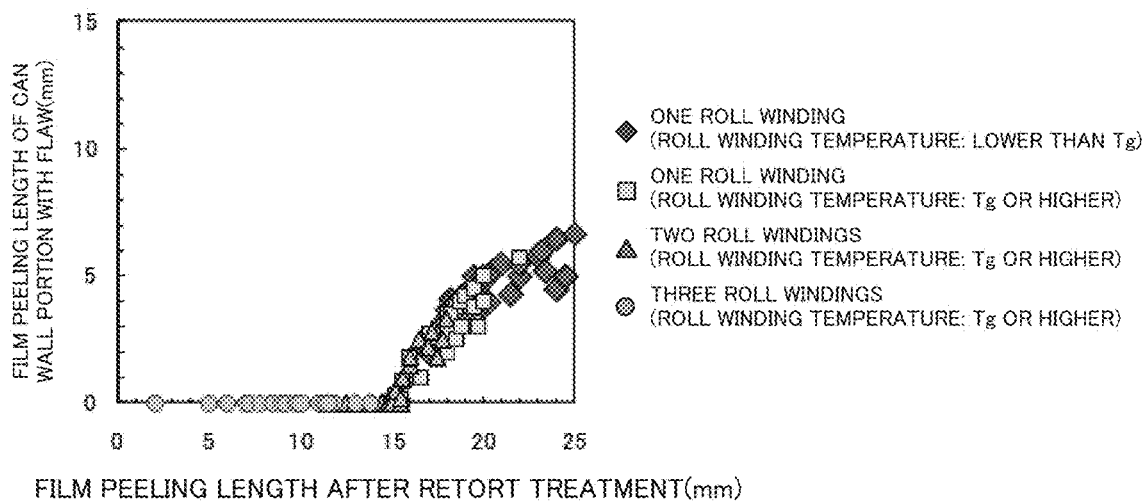
FIG. 8 is a view showing a relationship between a film peeling length of a laminate steel plate after retort treatment and a film peeling length of a can wall inner surface portion with a flaw.

The reason why the film peeling length after retort treatment used in the above description generally needs to be 15 mm or less is shown in FIG. 8. This is because, when the film peeling length after retort treatment is 15 mm or less, the film peeling length of a can wall portion with a flaw can be secured to be 0 mm. The film peeling length after retort treatment is measured as follows.

A test piece having a width of 30 mm is prepared by cutting a portion of one end side of the metal plate 1 in the longitudinal direction while leaving the resin film 5 on the side which becomes the inner surface side of a container when the metal plate 1 is processed into a container. A 100 g weight is hung from one end side of the test piece and the test piece is folded back toward the other end side of the test piece in the longitudinal direction by 180°. In this state, the test piece is subjected to a retort treatment at a temperature of 125° C. for 30 minutes. After the retort treatment, a length of the resin film 5 peeled off from the metal plate 1 is measured.

EXAMPLES

The film-laminated metal plate for a food container of the present invention will be described in detail with reference to examples. However, conditions in the examples are one condition example employed to confirm the feasibility and effect of the present invention, and the present invention is not limited to the following examples. It is also possible to carry out the present invention by adding appropriate modifications in a scope that can conform to the gist without departing from the gist of the present invention as long as the object of the present invention is achieved. Therefore, the present invention can employ various conditions, all of which are included in the technical features of the present invention.

Through examples and comparative examples, film-laminated metal plates obtained by laminating, resin films shown in Table 2 on metal plates shown in Table 1 under conditions shown in Table 3 are not subjected to printing or are subjected to a printing treatment, thereafter 180° film peeling test pieces having a width of 30 mm were prepared and subjected to a retort treatment at 125° C. for 30 minutes in a state in which a 100 g weight is hung from one side thereof, and thereafter film peeling lengths were measured.

Regarding evaluation of a can body formed product, after the film-laminated metal plate was subjected to DRD canning, a can inner surface ERV value was evaluated to measure the degree of damage of the film. In addition, a simulated food liquid (3% saline solution) was poured into the can subjected to the DRD canning, and was subjected to a retort treatment at 125° C. for 90 minutes, and the presence or absence of spot rusting on the can inner surface side was checked.

Specific descriptions will be provided as follows.

1. Metal Plate

Metal plates M1 to M5 shown in Table 1 were used. In a case where the metal plate was a plated steel plate or a chemical treatment steel plate, the contents thereof are also shown below.

M1 to M5 are metal plates obtained by subjecting a metal plate having a thickness of 0.20 mm and a surface roughness Ra of 0.3 μm to alkaline degreasing by a cathodic electrolytic treatment in a 5% sodium hydroxide aqueous solution. M1 is a chromium plated tinfree steel plate having a metal chromium layer (80 mg/m$^2$) and a hydrated chromium oxide layer (10 mg/m$^2$) on the surface of the steel plate. M2 is a tin plated steel plate subjected to a reflow treatment, and is a so-called tinplate having a Sn—Fe alloy layer (1.3 g/m$^2$), a pure Sn layer (1.5 g/m$^2$) and a hydrated chromium oxide layer (10 mg/m$^2$) from the steel plate side. M3 is a tin plated steel plate subjected to a reflow treatment, and is a chromate free Sn plated steel plate having a chromate free type chemical treatment film primarily including a Sn—Fe alloy layer (1.3 g/m$^2$), a Sn layer (1.5 g/m$^2$), and $ZrO_2$ (a Zr amount of 5 mg/m$^2$) from the steel plate side. M4 is a tin plated steel plate subjected to a reflow treatment, and is a chromate free Sn plated steel plate having a chromate free type chemical treatment film primarily including a Sn—Fe alloy layer (1.3 g/m$^2$), a Sn layer (1.5 g/m$^2$), and $TiO_2$ (a Ti amount of 5 mg/m$^2$) from the steel plate side. M5 is a chromate free type aluminum plate having a chromate free type chemical treatment film primarily in which a $ZrO_2$ (a Zr amount of 5 mg/m$^2$) coating layer is formed on an aluminum alloy plate (A5052).

TABLE 1

| Symbol | Metal plate | Thickness (mm) | Plating kind, plating amount | Chemical treatment film | | Adhered amount (mg/m$^2$) |
|---|---|---|---|---|---|---|
| | | | | Processing contents | Film kind | |
| M1 | Steel plate | 0.20 | Metal Cr: 80 mg/m$^2$ | Anhydrous chromate cathodic electrolytic treatment (chromium plated tinfree steel) | Chromium oxide and hydroxide | 10 |
| M2 | Steel plate | 0.20 | Sn—Fe alloy: 1.3 g/m$^2$ Pure Sn: 1.5 g/m$^2$ | Anhydrous chromate cathodic electrolytic treatment | Chromium oxide and hydroxide | 8 |
| M3 | Steel plate | 0.20 | Sn—Fe alloy: 1.3 g/m$^2$ Metal Sn: 1.5 g/m$^2$ | Zirconium fluoride cathodic electrolytic treatment | Zirconium oxide and hydroxide | 5 |
| M4 | Steel plate | 0.20 | Sn—Fe alloy: 1.3 g/m$^2$ Metal Sn: 1.5 g/m$^2$ | Titanium fluoride cathodic electrolytic treatment | Titanium oxide and hydroxide | 5 |
| M5 | Aluminum (A5052) | 0.20 | None | Zirconium fluoride cathodic electrolytic treatment | Zirconium oxide and hydroxide | 5 |

2. Resin Film

Polyester films P1 to P16 shown in Table 2 were used.

As the polyester film, a biaxially stretched film of polyethylene terephthalate (PET) shown in P1 to P5, a biaxially stretched film (IA-PET) of a copolymer of polyethylene terephthalate and polyethylene isophthalate (12 mol % of isophthalate) is shown in P6 to P10, a copolymer (PET-PBT) of polyethylene terephthalate and polybutylene terephthalate shown in P10 to P15, and a biaxially stretched film (IA-PET) of a copolymer of polyethylene terephthalate and polyethylene isophthalate (12 mol % of isophthalate) shown in P16 were used.

TABLE 2

| Symbol | Kind | Inherent viscosity IV | Glass transition temperature Tg (° C.) | Crystallization temperature Tc (° C.) | Melting point Tm (° C.) | Thermal shrinkage ratio (%) | Thickness (μm) | Elongation (%) |
|---|---|---|---|---|---|---|---|---|
| P1 | Stretched clear HOMO-PET film | 0.60 | 70 | 150 | 257 | 10 | 8 | 110 |
| P2 | Stretched clear HOMO-PET film | 0.60 | 70 | 150 | 257 | 10 | 18 | 160 |
| P3 | Stretched clear HOMO-PET film | 0.60 | 70 | 150 | 257 | 10 | 30 | 180 |
| P4 | Stretched clear HOMO-PET film | 0.60 | 70 | 150 | 257 | 10 | 6 | 100 |
| P5 | Stretched clear HOMO-PET film | 0.60 | 70 | 150 | 257 | 10 | 35 | 180 |
| P6 | Stretched clear IA (12 mol %)-PET | 0.60 | 68 | 125 | 228 | 5 | 8 | 150 |
| P7 | Stretched clear IA (12 mol %)-PET | 0.60 | 68 | 125 | 228 | 5 | 19 | 180 |
| P8 | Stretched clear IA (12 mol %)-PET | 0.60 | 68 | 125 | 228 | 5 | 30 | 190 |
| P9 | Stretched clear IA (12 mol %)-PET | 0.60 | 68 | 125 | 228 | 5 | 6 | 120 |
| P10 | Stretched clear IA (12 mol %)-PET | 0.60 | 68 | 125 | 228 | 5 | 35 | 200 |
| P11 | Stretched clear PET-PBT (50 mass %) | 0.60 | 65 | 150 | 224 | 5 | 8 | 110 |
| P12 | Stretched clear PET-PBT (50 mass %) | 0.60 | 65 | 150 | 224 | 5 | 20 | 130 |
| P13 | Stretched clear PET-PBT (50 mass %) | 0.60 | 65 | 150 | 224 | 5 | 30 | 150 |
| P14 | Stretched clear PET-PBT (50 mass %) | 0.60 | 65 | 150 | 224 | 5 | 6 | 100 |
| P15 | Stretched clear PET-PBT (50 mass %) | 0.60 | 65 | 150 | 224 | 5 | 35 | 150 |

TABLE 2-continued

| Symbol | Kind | Inherent viscosity IV | Glass transition temperature Tg (° C.) | Crystallization temperature Tc (° C.) | Melting point Tm (° C.) | Thermal shrinkage ratio (%) | Thickness (μm) | Elongation (%) |
|---|---|---|---|---|---|---|---|---|
| P16 | Stretched white IA (12 mol %)-PET | 0.60 | 68 | 125 | 228 | 5 | 13 | 110 |

The glass transition temperature (Tg) and the crystallization temperature (Tc) of the polyester-based film were obtained from the temperatures at the endothermic peak and the exothermic peak when the film was thermally analyzed with a differential scanning calorimeter. More specifically, the temperature of 8 mg of a film sealed in an aluminum pan was increased at a temperature rising rate of 10° C./min and measured with DSC 7030 manufactured by Hitachi High-Tech Science Corporation.

The elongation of the polyester-based film was measured by the following method.

The film was cut into 10 mm×70 mm, a cellophane tape was adhered to 20 mm portions at both ends thereof for reinforcement, thereby preparing a tension test piece. In the tension test, after setting the distance between the chucks of the tension tester to 30 mm, grip sections of 20 mm at both ends of the thin film test piece were nipped between the chucks to be fixed in the chuck parts, and measurement was carried out at 20 mm/min. The elongation was calculated by dividing the movement distance of the chuck when the thin film test piece was broken by 30 mm of the original chuck-to-chuck distance, and displaying the value in percentage.

3. Film Lamination Method

In a film lamination method, a dedicated film laminating apparatus was used. The film laminating apparatus includes a metal strip feeding device, a metal heating roll for heating a metal plate, a film feeding device of the front and rear surfaces, a heat-resistant rubber laminate roll (the surface temperature of the rubber roll is controlled by a metal heating backup roll), a cooling water tank, passing rolls (it is possible to change the number of times of winding of the film-laminated metal plate around the rolls after cooling to one to four by changing a passing pass), and a winding device of the film-laminated metal plate, and is an apparatus capable of preparing a film laminate metal strip by continuously passing a metal strip having a plate width of 300 mm. The schematic configuration of the film laminate apparatus is as shown in FIG. 6 described above.

In the manufacturing of the film-laminated metal plate, the metal plate fed from the metal strip feeding device was heated to a predetermined temperature through the heating roll for heating the metal plate, the film for the front and rear surfaces of the metal plate was thereafter fed from the film feeding device simultaneously with the metal plate fed to the film laminate roll so as to be pressure bonded to the surface of the metal plate with the laminate rolls, cooling with warm water was thereafter carried out in the cooling tank, the passing direction was changed while winding around a plurality of passing rolls in an arc shape, and winding was carried out by the winding device. The conditions of the diameter of the passing roll, the amount of the film winding around the passing roll (roll circumferential length ratio), and the tension of the laminate metal plate after the film lamination are shown in Table 3.

TABLE 3

Diameter of passing roll after lamination, and film winding amount (roll circumferential length ratio)

| | First roll | | Second roll | | Third roll | | Fourth roll | | Tension of film- |
|---|---|---|---|---|---|---|---|---|---|
| Level | Roll diameter | Film winding amount | Roll diameter | Film winding amount | Roll diameter | Film winding amount | Roll diameter | Film winding amount | laminated metal plate (N/mm²) |
| R1 | 400 mm | 37.5% | 400 mm | 25% | 400 mm | 25% | 400 mm | 25% | 40 |
| R2 | 400 mm | 37.5% | 200 mm | 25% | 200 mm | 25% | 200 mm | 25% | 15 |
| R3 | 400 mm | 37.5% | 200 mm | 25% | 200 mm | 25% | 200 mm | 25% | 20 |
| R4 | 400 mm | 37.5% | 200 mm | 25% | 200 mm | 25% | 200 mm | 25% | 60 |
| R5 | 400 mm | 37.5% | 200 mm | 25% | 200 mm | 25% | 200 mm | 25% | 65 |
| R6 | 400 mm | 37.5% | 600 mm | 25% | 600 mm | 25% | 600 mm | 25% | 15 |
| R7 | 400 mm | 37.5% | 600 mm | 25% | 600 mm | 25% | 600 mm | 25% | 20 |
| R8 | 400 mm | 37.5% | 600 mm | 25% | 600 mm | 25% | 600 mm | 25% | 60 |
| R9 | 400 mm | 37.5% | 600 mm | 25% | 600 mm | 25% | 600 mm | 25% | 65 |
| R10 | 400 mm | 37.5% | 400 mm | 20% | 400 mm | 20% | 400 mm | 20% | 40 |
| R11 | 400 mm | 37.5% | 400 mm | 55% | 400 mm | 55% | 400 mm | 55% | 40 |
| R12 | 400 mm | 37.5% | 180 mm | 25% | 180 mm | 25% | 180 mm | 25% | 40 |
| R13 | 400 mm | 37.5% | 650 mm | 25% | 650 mm | 25% | 650 mm | 25% | 40 |
| R14 | 400 mm | 37.5% | 400 mm | 25% | 400 mm | 25% | None | | 40 |
| R15 | 400 mm | 37.5% | 400 mm | 25% | None | | None | | 40 |
| R16 | 400 mm | 37.5% | None | | None | | None | | 40 |

The configuration of the film-laminated metal plate and the film lamination conditions (the temperature of the metal plate when the film was laminated on the metal plate, the surface temperature of the laminate roll, the time until the cooling and the cooling water temperature) are shown in Tables 4 and 5. The surface temperature of the laminate metal plate on the outlet side of the cooling tank, the number of times of roll winding, the surface temperature of the laminate metal plate immediately after passing each of the rolls, and whether the temperature is equal to or higher than the glass transition temperature (Tg) and lower than the crystallization temperature (Tc) were shown as Good (in a case where the temperature was equal to or higher than the glass transition temperature (Tg) and lower than the crystallization temperature (Tc)) or Bad (in a case of deviating from a temperature of equal to or lower than the glass transition temperature (Tg) and lower than the crystallization temperature (Tc)) in Tables 6 and 7.

TABLE 4

| | Film-laminated metal plate configuration | | | | | Film lamination condition | | | |
|---|---|---|---|---|---|---|---|---|---|
| | | Evaluation surface film | | | | | | Time from | |
| Test No. | Metal plate | Film | Glass transition temperature (Tg) (° C.) | Crystallization temperature (Tc) (° C.) | Opposite surface film | Metal plate temperature during lamination (T1) | Laminate roll surface temperature (T2) | film roll pressure bonding to cooling (sec) | Cooling water temperature |
| 1 | M1 | P2 | 70 | 150 | P16 | 285° C. | 110° C. | 1.0 | 85° C. |
| 2 | M1 | P2 | 70 | 150 | P16 | 275° C. | 110° C. | 1.0 | 85° C. |
| 3 | M1 | P2 | 70 | 150 | P16 | 270° C. | 110° C. | 1.0 | 85° C. |
| 4 | M1 | P2 | 70 | 150 | P16 | 260° C. | 110° C. | 1.0 | 85° C. |
| 5 | M1 | P2 | 70 | 150 | P16 | 285° C. | 110° C. | 1.0 | 85° C. |
| 6 | M1 | P2 | 70 | 150 | P16 | 280° C. | 110° C. | 1.0 | 85° C. |
| 7 | M1 | P2 | 70 | 150 | P16 | 280° C. | 110° C. | 1.0 | 85° C. |
| 8 | M1 | P2 | 70 | 150 | P16 | 280° C. | 110° C. | 1.0 | 85° C. |
| 9 | M1 | P2 | 70 | 150 | P16 | 280° C. | 110° C. | 1.0 | 85° C. |
| 10 | M1 | P2 | 70 | 150 | P16 | 280° C. | 110° C. | 1.0 | 85° C. |
| 11 | M1 | P2 | 70 | 150 | P16 | 280° C. | 110° C. | 1.0 | 85° C. |
| 12 | M1 | P2 | 70 | 150 | P16 | 280° C. | 110° C. | 1.0 | 85° C. |
| 13 | M1 | P2 | 70 | 150 | P16 | 280° C. | 110° C. | 1.0 | 85° C. |
| 14 | M1 | P2 | 70 | 150 | P16 | 280° C. | 110° C. | 1.0 | 85° C. |
| 15 | M1 | P2 | 70 | 150 | P16 | 280° C. | 110° C. | 1.0 | 85° C. |
| 16 | M1 | P2 | 70 | 150 | P16 | 280° C. | 110° C. | 1.0 | 85° C. |
| 17 | M1 | P2 | 70 | 150 | P16 | 280° C. | 110° C. | 2.0 | 85° C. |
| 18 | M1 | P2 | 70 | 150 | P16 | 280° C. | 110° C. | 2.2 | 85° C. |
| 19 | M1 | P1 | 70 | 150 | P16 | 280° C. | 110° C. | 1.0 | 85° C. |
| 20 | M1 | P3 | 70 | 150 | P16 | 280° C. | 110° C. | 1.0 | 85° C. |
| 21 | M1 | P4 | 70 | 150 | P16 | 280° C. | 110° C. | 1.0 | 85° C. |
| 22 | M1 | P5 | 70 | 150 | P16 | 280° C. | 110° C. | 1.0 | 85° C. |
| 23 | M1 | P2 | 70 | 150 | P16 | 280° C. | 110° C. | 1.0 | 85° C. |
| 24 | M1 | P2 | 70 | 150 | P16 | 280° C. | 110° C. | 1.0 | 85° C. |
| 25 | M1 | P2 | 70 | 150 | P16 | 280° C. | 110° C. | 1.0 | 85° C. |
| 26 | M1 | P7 | 68 | 125 | P16 | 270° C. | 110° C. | 1.0 | 85° C. |
| 27 | M1 | P7 | 68 | 125 | P16 | 240° C. | 110° C. | 1.0 | 85° C. |
| 28 | M1 | P7 | 68 | 125 | P16 | 255° C. | 110° C. | 1.0 | 85° C. |
| 29 | M1 | P7 | 68 | 125 | P16 | 255° C. | 110° C. | 1.0 | 85° C. |
| 30 | M1 | P7 | 68 | 125 | P16 | 255° C. | 110° C. | 1.0 | 85° C. |
| 31 | M1 | P7 | 68 | 125 | P16 | 255° C. | 110° C. | 1.0 | 85° C. |
| 32 | M1 | P7 | 68 | 125 | P16 | 255° C. | 110° C. | 1.0 | 85° C. |
| 33 | M1 | P7 | 68 | 125 | P16 | 255° C. | 110° C. | 1.0 | 85° C. |
| 34 | M1 | P7 | 68 | 125 | P16 | 255° C. | 110° C. | 1.0 | 85° C. |
| 35 | M1 | P7 | 68 | 125 | P16 | 255° C. | 110° C. | 1.0 | 85° C. |
| 36 | M1 | P7 | 68 | 125 | P16 | 255° C. | 110° C. | 1.0 | 85° C. |
| 37 | M1 | P7 | 68 | 125 | P16 | 255° C. | 110° C. | 1.0 | 85° C. |
| 38 | M1 | P7 | 68 | 125 | P16 | 255° C. | 110° C. | 1.0 | 85° C. |
| 39 | M1 | P7 | 68 | 125 | P16 | 255° C. | 110° C. | 1.0 | 85° C. |
| 40 | M1 | P7 | 68 | 125 | P16 | 255° C. | 110° C. | 2.0 | 85° C. |
| 41 | M1 | P7 | 68 | 125 | P16 | 255° C. | 110° C. | 2.2 | 85° C. |
| 42 | M1 | P6 | 68 | 125 | P16 | 255° C. | 110° C. | 1.0 | 85° C. |
| 43 | M1 | P8 | 68 | 125 | P16 | 255° C. | 110° C. | 1.0 | 85° C. |
| 44 | M1 | P9 | 68 | 125 | P16 | 255° C. | 110° C. | 1.0 | 85° C. |
| 45 | M1 | P10 | 68 | 125 | P16 | 255° C. | 110° C. | 1.0 | 85° C. |
| 46 | M1 | P7 | 68 | 125 | P16 | 255° C. | 110° C. | 1.0 | 85° C. |
| 47 | M1 | P7 | 68 | 125 | P16 | 255° C. | 110° C. | 1.0 | 85° C. |
| 48 | M1 | P7 | 68 | 125 | P16 | 255° C. | 110° C. | 1.0 | 85° C. |

TABLE 5

| | | | | | | Film lamination condition | | | |
|---|---|---|---|---|---|---|---|---|---|
| | Film-laminated metal plate configuration | | | | | | | Time from | |
| | | Evaluation surface film | | | | | | film roll | |
| | | | Glass | | | Metal plate | | pressure | |
| | | | transition | Crystallization | | temperature | Laminate | bonding to | Cooling |
| Test | Metal | | temperature | temperature | Opposite | during | roll surface | cooling | water |
| No. | plate | Film | (Tg) (° C.) | (Tc) (° C.) | surface film | lamination (T1) | temperature (T2) | (sec) | temperature |
| 49 | M1 | P12 | 65 | 150 | P16 | 265° C. | 100° C. | 1.0 | 85° C. |
| 50 | M1 | P12 | 65 | 150 | P16 | 280° C. | 100° C. | 1.0 | 85° C. |
| 51 | M1 | P12 | 65 | 150 | P16 | 235° C. | 100° C. | 1.0 | 85° C. |
| 52 | M1 | P12 | 65 | 150 | P16 | 255° C. | 100° C. | 1.0 | 85° C. |
| 53 | M1 | P12 | 65 | 150 | P16 | 255° C. | 100° C. | 1.0 | 85° C. |
| 54 | M1 | P12 | 65 | 150 | P16 | 255° C. | 100° C. | 1.0 | 85° C. |
| 55 | M1 | P12 | 65 | 150 | P16 | 255° C. | 100° C. | 1.0 | 85° C. |
| 56 | M1 | P12 | 65 | 150 | P16 | 255° C. | 100° C. | 1.0 | 85° C. |
| 57 | M1 | P12 | 65 | 150 | P16 | 255° C. | 100° C. | 1.0 | 85° C. |
| 58 | M1 | P12 | 65 | 150 | P16 | 255° C. | 100° C. | 1.0 | 85° C. |
| 59 | M1 | P12 | 65 | 150 | P16 | 255° C. | 100° C. | 1.0 | 85° C. |
| 60 | M1 | P12 | 65 | 150 | P16 | 255° C. | 100° C. | 1.0 | 85° C. |
| 61 | M1 | P12 | 65 | 150 | P16 | 255° C. | 100° C. | 1.0 | 85° C. |
| 62 | M1 | P12 | 65 | 150 | P16 | 255° C. | 100° C. | 1.0 | 85° C. |
| 63 | M1 | P12 | 65 | 150 | P16 | 255° C. | 100° C. | 1.0 | 85° C. |
| 64 | M1 | P12 | 65 | 150 | P16 | 255° C. | 100° C. | 2.0 | 85° C. |
| 65 | M1 | P12 | 65 | 150 | P16 | 255° C. | 100° C. | 2.2 | 85° C. |
| 66 | M1 | P11 | 65 | 150 | P16 | 255° C. | 100° C. | 1.0 | 85° C. |
| 67 | M1 | P13 | 65 | 150 | P16 | 255° C. | 100° C. | 1.0 | 85° C. |
| 68 | M1 | P14 | 65 | 150 | P16 | 255° C. | 100° C. | 1.0 | 85° C. |
| 69 | M1 | P15 | 65 | 150 | P16 | 255° C. | 100° C. | 1.0 | 85° C. |
| 70 | M1 | P12 | 65 | 150 | P16 | 255° C. | 100° C. | 1.0 | 85° C. |
| 71 | M1 | P12 | 65 | 150 | P16 | 255° C. | 100° C. | 1.0 | 85° C. |
| 72 | M1 | P12 | 65 | 150 | P16 | 255° C. | 100° C. | 1.0 | 85° C. |
| 73 | M2 | P2 | 70 | 150 | P16 | 285° C. | 110° C. | 1.0 | 85° C. |
| 74 | M3 | P2 | 70 | 150 | P16 | 285° C. | 110° C. | 1.0 | 85° C. |
| 75 | M4 | P2 | 70 | 150 | P16 | 285° C. | 110° C. | 1.0 | 85° C. |
| 76 | M5 | P2 | 70 | 150 | P16 | 285° C. | 110° C. | 1.0 | 85° C. |
| 77 | M2 | P2 | 70 | 150 | P16 | 285° C. | 110° C. | 2.0 | 85° C. |
| 78 | M2 | P2 | 70 | 150 | P16 | 285° C. | 110° C. | 2.2 | 85° C. |
| 79 | M2 | P2 | 70 | 150 | P16 | 285° C. | 110° C. | 1.0 | 85° C. |
| 80 | M2 | P2 | 70 | 150 | P16 | 285° C. | 110° C. | 1.0 | 85° C. |
| 81 | M2 | P2 | 70 | 150 | P16 | 285° C. | 110° C. | 1.0 | 85° C. |
| 82 | M2 | P7 | 68 | 125 | P16 | 255° C. | 100° C. | 1.0 | 85° C. |
| 83 | M3 | P7 | 68 | 125 | P16 | 255° C. | 100° C. | 1.0 | 85° C. |
| 84 | M4 | P7 | 68 | 125 | P16 | 255° C. | 100° C. | 1.0 | 85° C. |
| 85 | M5 | P7 | 68 | 125 | P16 | 255° C. | 100° C. | 1.0 | 85° C. |
| 86 | M3 | P7 | 68 | 125 | P16 | 255° C. | 100° C. | 2.0 | 85° C. |
| 87 | M3 | P7 | 68 | 125 | P16 | 255° C. | 100° C. | 2.2 | 85° C. |
| 88 | M3 | P7 | 68 | 125 | P16 | 255° C. | 100° C. | 1.0 | 85° C. |
| 89 | M3 | P7 | 68 | 125 | P16 | 255° C. | 100° C. | 1.0 | 85° C. |
| 90 | M3 | P7 | 68 | 125 | P16 | 255° C. | 100° C. | 1.0 | 85° C. |
| 91 | M2 | P12 | 65 | 150 | P16 | 255° C. | 100° C. | 1.0 | 85° C. |
| 92 | M3 | P12 | 65 | 150 | P16 | 255° C. | 100° C. | 1.0 | 85° C. |
| 93 | M4 | P12 | 65 | 150 | P16 | 255° C. | 100° C. | 1.0 | 85° C. |
| 94 | M5 | P12 | 65 | 150 | P16 | 255° C. | 100° C. | 1.0 | 85° C. |
| 95 | M5 | P12 | 65 | 150 | P16 | 255° C. | 100° C. | 2.0 | 85° C. |
| 96 | M5 | P12 | 65 | 150 | P16 | 255° C. | 100° C. | 2.2 | 85° C. |
| 97 | M5 | P12 | 65 | 150 | P16 | 255° C. | 100° C. | 1.0 | 85° C. |
| 98 | M5 | P12 | 65 | 150 | P16 | 255° C. | 100° C. | 1.0 | 85° C. |
| 99 | M5 | P12 | 65 | 150 | P16 | 255° C. | 100° C. | 1.0 | 85° C. |

TABLE 6

| | | | Roll winding condition after film lamination | | | | | | | |
|---|---|---|---|---|---|---|---|---|---|---|
| | | | Laminate metal plate surface temperature after roll passing (° C.) | | | | | | | |
| | | | First roll | | Second roll | | Third roll | | Fourth roll | |
| Test No. | Passing roll condition after lamination | Number of times of roll winding | Plate temperature immediately after roll passing (° C.) | Whether temperature is equal to or higher than glass transition temperature (Tg) and lower than crystallization temperature (Tc) | plate temperature immediately after roll passing (° C.) | Whether temperature is equal to or higher than glass transition temperature (Tg) and lower than crystallization temperature (Tc) | plate temperature immediately after roll passing (° C.) | Whether temperature is equal to or higher than glass transition temperature (Tg) and lower than crystallization temperature (Tc) | plate temperature immediately after roll passing (° C.) | Whether temperature is equal to or higher than glass transition temperature (Tg) and lower than crystallization temperature (Tc) |
| 1 | R1 | 4 | 125 | Good | 110 | Good | 95 | Good | 80 | Good |
| 2 | R1 | 4 | 115 | Good | 100 | Good | 85 | Good | 70 | Good |
| 3 | R1 | 4 | 110 | Good | 95 | Good | 80 | Good | 65 | Bad |
| 4 | R1 | 4 | 95 | Good | 80 | Good | 65 | Bad | 60 | Bad |
| 5 | R2 | 4 | 120 | Good | 115 | Good | 90 | Good | 75 | Good |
| 6 | R3 | 4 | 120 | Good | 110 | Good | 95 | Good | 80 | Good |
| 7 | R4 | 4 | 120 | Good | 110 | Good | 95 | Good | 80 | Good |
| 8 | R5 | 4 | 115 | Good | 105 | Good | 90 | Good | 75 | Good |
| 9 | R6 | 4 | 110 | Good | 100 | Good | 85 | Good | 70 | Good |
| 10 | R7 | 4 | 110 | Good | 100 | Good | 85 | Good | 75 | Good |
| 11 | R8 | 4 | 105 | Good | 95 | Good | 80 | Good | 70 | Good |
| 12 | R9 | 4 | 95 | Good | 85 | Good | 70 | Good | 60 | Bad |
| 13 | R10 | 4 | 120 | Good | 115 | Good | 90 | Good | 75 | Good |
| 14 | R11 | 4 | 115 | Good | 110 | Good | 85 | Good | 70 | Good |
| 15 | R12 | 4 | 120 | Good | 115 | Good | 90 | Good | 75 | Good |
| 16 | R13 | 4 | 110 | Good | 105 | Good | 80 | Good | 60 | Bad |
| 17 | R1 | 4 | 125 | Good | 110 | Good | 95 | Good | 80 | Good |
| 18 | R1 | 4 | 125 | Good | 110 | Good | 95 | Good | 80 | Good |
| 19 | R1 | 4 | 125 | Good | 110 | Good | 95 | Good | 80 | Good |
| 20 | R1 | 4 | 125 | Good | 110 | Good | 95 | Good | 80 | Good |
| 21 | R1 | 4 | 125 | Good | 110 | Good | 95 | Good | 80 | Good |
| 22 | R1 | 4 | 125 | Good | 110 | Good | 95 | Good | 80 | Good |
| 23 | R14 | 3 | 120 | Good | 110 | Good | 95 | Good | | None |
| 24 | R15 | 2 | 120 | Good | 110 | Good | | None | | None |
| 25 | R16 | 1 | 120 | Good | | None | | None | | None |
| 26 | R1 | 4 | 115 | Good | 100 | Good | 85 | Good | 70 | Good |
| 27 | R1 | 4 | 80 | Good | 65 | Bad | 50 | Bad | 45 | Bad |
| 28 | R2 | 4 | 90 | Good | 75 | Good | 60 | Bad | 50 | Bad |
| 29 | R3 | 4 | 100 | Good | 85 | Good | 70 | Good | 60 | Bad |
| 30 | R4 | 4 | 98 | Good | 83 | Good | 68 | Good | 58 | Bad |
| 31 | R5 | 4 | 95 | Good | 80 | Good | 65 | Bad | 55 | Bad |
| 32 | R6 | 4 | 90 | Good | 75 | Good | 60 | Bad | 50 | Bad |
| 33 | R7 | 4 | 100 | Good | 85 | Good | 70 | Good | 60 | Bad |
| 34 | R8 | 4 | 95 | Good | 83 | Good | 68 | Good | 60 | Bad |
| 35 | R9 | 4 | 90 | Good | 80 | Good | 65 | Bad | 60 | Bad |
| 36 | R10 | 4 | 105 | Good | 90 | Good | 75 | Good | 65 | Bad |
| 37 | R11 | 4 | 90 | Good | 75 | Good | 70 | Good | 50 | Bad |
| 38 | R12 | 4 | 100 | Good | 85 | Good | 70 | Good | 60 | Bad |
| 39 | R13 | 4 | 90 | Good | 75 | Good | 70 | Good | 60 | Bad |
| 40 | R1 | 4 | 95 | Good | 80 | Good | 70 | Good | 65 | Bad |
| 41 | R1 | 4 | 95 | Good | 80 | Good | 70 | Good | 65 | Bad |
| 42 | R1 | 4 | 100 | Good | 85 | Good | 70 | Good | 60 | Bad |
| 43 | R1 | 4 | 100 | Good | 85 | Good | 70 | Good | 60 | Bad |
| 44 | R1 | 4 | 100 | Good | 85 | Good | 70 | Good | 60 | Bad |
| 45 | R1 | 4 | 100 | Good | 85 | Good | 70 | Good | 60 | Bad |
| 46 | R14 | 3 | 100 | Good | 85 | Good | 70 | Good | | None |
| 47 | R15 | 2 | 100 | Good | 85 | Good | | None | | None |
| 48 | R16 | 1 | 100 | Good | | None | | None | | None |

TABLE 7

| | | | Roll winding condition after film lamination | | | | | | | |
|---|---|---|---|---|---|---|---|---|---|---|
| | | | Laminate metal plate surface temperature after roll passing (° C.) | | | | | | | |
| | | | First roll | | Second roll | | Third roll | | Fourth roll | |
| Test No. | Passing roll condition after lamination | Number of times of roll winding | Plate temperature immediately after roll passing (° C.) | Whether temperature is equal to or higher than glass transition temperature (Tg) and lower than crystallization temperature (Tc) | plate temperature immediately after roll passing (° C.) | Whether temperature is equal to or higher than glass transition temperature (Tg) and lower than crystallization temperature (Tc) | plate temperature immediately after roll passing (° C.) | Whether temperature is equal to or higher than glass transition temperature (Tg) and lower than crystallization temperature (Tc) | plate temperature immediately after roll passing (° C.) | Whether temperature is equal to or higher than glass transition temperature (Tg) and lower than crystallization temperature (Tc) |
| 49 | R1 | 4 | 110 | Good | 95 | Good | 80 | Good | 65 | Good |
| 50 | R1 | 4 | 130 | Good | 115 | Good | 100 | Good | 85 | Good |
| 51 | R1 | 4 | 75 | Good | 62 | Bad | 50 | Bad | 45 | Bad |
| 52 | R2 | 4 | 90 | Good | 75 | Good | 60 | Bad | 50 | Bad |
| 53 | R3 | 4 | 100 | Good | 85 | Good | 70 | Good | 60 | Bad |
| 54 | R4 | 4 | 98 | Good | 83 | Good | 68 | Good | 58 | Bad |
| 55 | R5 | 4 | 95 | Good | 80 | Good | 65 | Good | 55 | Bad |
| 56 | R6 | 4 | 90 | Good | 75 | Good | 60 | Bad | 50 | Bad |
| 57 | R7 | 4 | 100 | Good | 85 | Good | 70 | Good | 60 | Bad |
| 58 | R8 | 4 | 95 | Good | 83 | Good | 68 | Good | 60 | Bad |
| 59 | R9 | 4 | 90 | Good | 80 | Good | 65 | Good | 60 | Bad |
| 60 | R10 | 4 | 105 | Good | 90 | Good | 75 | Good | 65 | Good |
| 61 | R11 | 4 | 90 | Good | 75 | Good | 65 | Good | 50 | Bad |
| 62 | R12 | 4 | 100 | Good | 85 | Good | 70 | Good | 60 | Bad |
| 63 | R13 | 4 | 90 | Good | 75 | Good | 65 | Good | 60 | Bad |
| 64 | R1 | 4 | 95 | Good | 80 | Good | 70 | Good | 65 | Good |
| 65 | R1 | 4 | 95 | Good | 80 | Good | 70 | Good | 65 | Good |
| 66 | R1 | 4 | 100 | Good | 85 | Good | 70 | Good | 60 | Bad |
| 67 | R1 | 4 | 100 | Good | 85 | Good | 70 | Good | 60 | Bad |
| 68 | R1 | 4 | 100 | Good | 85 | Good | 70 | Good | 60 | Bad |
| 69 | R1 | 4 | 100 | Good | 85 | Good | 70 | Good | 60 | Bad |
| 70 | R14 | 3 | 100 | Good | 85 | Good | 70 | Good | | None |
| 71 | R15 | 2 | 100 | Good | 85 | Good | | None | | None |
| 72 | R16 | 1 | 100 | Good | | None | | None | | None |
| 73 | R1 | 4 | 125 | Good | 110 | Good | 95 | Good | 80 | Good |
| 74 | R1 | 4 | 125 | Good | 110 | Good | 95 | Good | 80 | Good |
| 75 | R1 | 4 | 125 | Good | 110 | Good | 95 | Good | 80 | Good |
| 76 | R1 | 4 | 110 | Good | 95 | Good | 80 | Good | 65 | Bad |
| 77 | R1 | 4 | 125 | Good | 110 | Good | 95 | Good | 80 | Good |
| 78 | R1 | 4 | 125 | Good | 110 | Good | 95 | Good | 80 | Good |
| 79 | R14 | 3 | 125 | Good | 110 | Good | 95 | Good | | None |
| 80 | R15 | 2 | 125 | Good | 110 | Good | | None | | None |
| 81 | R16 | 1 | 125 | Good | | None | | None | | None |
| 82 | R1 | 4 | 100 | Good | 85 | Good | 70 | Good | 60 | Bad |
| 83 | R1 | 4 | 100 | Good | 85 | Good | 70 | Good | 60 | Bad |
| 84 | R1 | 4 | 100 | Good | 85 | Good | 70 | Good | 60 | Bad |
| 85 | R1 | 4 | 85 | Good | 60 | Bad | 55 | Bad | 50 | Bad |
| 86 | R1 | 4 | 100 | Good | 85 | Good | 70 | Good | 60 | Bad |
| 87 | R1 | 4 | 100 | Good | 85 | Good | 70 | Good | 60 | Bad |
| 88 | R14 | 3 | 100 | Good | 85 | Good | 70 | Good | | None |
| 89 | R15 | 2 | 100 | Good | 85 | Good | | None | | None |
| 90 | R16 | 1 | 100 | Good | | None | | None | | None |
| 91 | R1 | 4 | 100 | Good | 85 | Good | 70 | Good | 60 | Bad |
| 92 | R1 | 4 | 100 | Good | 85 | Good | 70 | Good | 60 | Bad |
| 93 | R1 | 4 | 100 | Good | 85 | Good | 70 | Good | 60 | Bad |
| 94 | R1 | 4 | 85 | Good | 60 | Bad | 55 | Bad | 50 | Bad |
| 95 | R1 | 4 | 100 | Good | 85 | Good | 70 | Good | 60 | Bad |
| 96 | R1 | 4 | 100 | Good | 85 | Good | 70 | Good | 60 | Bad |
| 97 | R14 | 3 | 100 | Good | 85 | Good | 70 | Good | | None |
| 98 | R15 | 2 | 100 | Good | 85 | Good | | None | | None |
| 99 | R16 | 1 | 100 | Good | | None | | None | | None |

4. Measurement Method of Bubble Height

Measurement of bubbles between the film of the film-laminated metal plate and the metal plate was carried out by the following method.

Samples of 10 mm×10 mm were cut and taken from three random points in a sample of a laminate steel plate of 20 cm in width×30 cm in length, An image of 10 random visual fields for the film surface of each of the samples was taken at a magnification of 200-fold (visual field: 0.50 mm in length×0.705 mm in width) using a laser microscope (laser microscope VK-8710, processor VK-8700, manufactured by Keyence Corporation), and the heights of bubbles were measured by an image analyzing software.

Regarding the heights of the bubbles, the cross-sectional profile of the film surface of a bubble portion was extracted (example: FIG. 5C) from a bubble portion laser microscope 3D profile image (example: FIG. 5B), a line connecting portions corresponding to both ends of the bubble with a straight line was used as a baseline, the length when a line perpendicular to the baseline was drawn from the highest point of the bubble was measured and used as the bubble height, and the average height of the bubbles was calculated from three bubbles with higher heights among bubbles of the three samples and used as the average bubble height of the prepared film-laminated metal plate.

6. Method for Evaluating Film Adhesiveness

The method for evaluating the film adhesiveness of the film-laminated metal plate is as follows.

First, the film-laminated metal plate was cut into a width of 30 mm and a length of 150 mm, a hole for hanging a weight was punched and opened in an end of the test piece, and then only a film of which the film adhesiveness is to be measured is left at a position of 50 mm in length from the side of the test piece where the hole is opened while the metal plate and the film and on the opposite side were subjected to slit processing and cutting by a dedicated slit processing device.

Next, the side of 50 mm in length of the test piece subjected to the slit cutting was folded back by 180° toward the remaining film side and was used as a test piece for evaluating the film adhesiveness.

Regarding the adhesiveness of the film, the side of the test piece for evaluating the film adhesiveness on which no hole was opened was vertically stood and fixed to a dedicated fixing jig, then a 100 g weight was hung from the hole on the side bent by 180°, the test piece in a state in which the weight was hung was placed in a retort cooker with fixing tool and was subjected to the retort treatment at 125° C. for 30 minutes, and the length of film peeled off was measured for evaluation.

7. Film Adhesiveness Determination Criteria

For determination of the film adhesiveness of the film-laminated metal plate, evaluation was carried out by the film adhesiveness evaluation method described above, that is, a film peeling length after the retort treatment carried out at 125° C. for 30 minutes in a state in which a 100 g weight was hung from one side of a 180° film peeling test piece having a width of 30 mm.

Evaluation was made by the following criteria, 2 to 4 were evaluated as pass, and 1 was evaluated as fail.

4: 0 mm≤peeling length≤5 mm
3: 5 mm<peeling length≤10 mm
2: 10 mm<peeling length≤15 mm
1: 15 mm<peeling length 8. Forming of Can Body The film-laminated metal plate was punched into a circular plate having a diameter of 155 mm by a punching press, then a shallow drawing cup was obtained by a cupping press so that the resin film for evaluation was on the inner surface, then the shallow drawing cup was further subjected to deep drawing, the flange portion was punched to be removed, and a can body (DRD can) having a diameter of 83 mm and a cup height of 46 mm was finally obtained.

9. Evaluation of Soundness of Film of can Body Formed Product

The soundness of the film after can retort treatment formed into a can body was evaluated by the following method.

After washing the DRD canned can with hexane to dissolve and remove wax, tap water was poured into the can, a retort treatment (125° C., 30 minutes) was carried out thereon, and thereafter the soundness of the film of the inner surface of the can was evaluated by an ERV test.

Regarding the soundness of the coating of the can, the ERV test is a method of evaluating the soundness of the inner surface of the can by pouring, into the can, an ERV test solution containing 1% saline and 0.2 g/l of a surfactant (RAPISOL manufactured by Nissan Chemical Corporation) added thereto, and investigating electrical conduction between the metal plate on the outer surface side of the can and the ERV test solution, and when 1 mA or less flows in general, it is determined that the soundness of the coating as a can is maintained.

10. Evaluation Criteria of Soundness of Film of can Body Formed Product

ERV measurement of the can body (DRD can) formed into a diameter of 83 mm and a cup height of 46 mm was carried out using a digital enamel rater (model: NDE-1200) manufactured by Nichia Corporation by removing the film on the outer surface side of the can with sand paper for connection to a clip of the positive electrode of the digital enamel rater, immersing a terminal rod of the negative electrode of the digital enamel rater into the ERV test solution in the can, and measuring the current value flowing when a voltage of 6.3 V was applied between the positive and negative electrodes in the digital enamel rater.

Evaluation was made by the following criteria, 2 to 4 were evaluated as pass, and 1 was evaluated as fail.

4: 0 mA≤ERV≤0.1 mA
3: 0.1 mA<ERV≤0.5 mA
2: 0.5 mA<ERV≤1 mA
1: 1 mA<ERV

11. Corrosion Resistance Evaluation Test

A simulated food liquid (3% saline solution) was poured into the obtained DRD can, and a retort treatment was carried out thereon at 125° C. for 90 minutes. After the retort treatment, whether or not corrosion had occurred on the inner surface side of the can was visually determined by the following criteria, 3 was evaluated as pass, and 2 and 1 were evaluated as fail.

3: No corrosion occurred
2: Although film was not peeled off, spot rusting had occurred on the inner surface of the can
1: Spot-like film floating had occurred on the can wall, and rust was generated The evaluation results are shown in Tables 8 and 9 together with the configuration of the film-laminated metal plate and film lamination conditions.

TABLE 8

| Test No. | Average bubble height (average value of three bubbles with higher heights among bubbles) (μm) | Film adhesiveness and DRD can characteristics evaluation result | | | Classification of Invention Example and Comparative Example |
|---|---|---|---|---|---|
| | | Film peeling test | DRD can ERV | DRD can corrosion resistance | |
| 1 | 0.5 | 4 | 4 | 3 | Invention Example |
| 2 | 1.5 | 4 | 4 | 3 | Invention Example |
| 3 | 3.0 | 2 | 2 | 3 | Invention Example |

TABLE 8-continued

| Test No. | Average bubble height (average value of three bubbles with higher heights among bubbles) (μm) | Film peeling test | DRD can ERV | DRD can corrosion resistance | Classification of Invention Example and Comparative Example |
|---|---|---|---|---|---|
| 4 | 5.5 | 1 | 1 | 1 | Comparative Example |
| 5 | 6.0 | 3 | 2 | 2 | Comparative Example |
| 6 | 1.0 | 4 | 4 | 3 | Invention Example |
| 7 | 1.0 | 4 | 4 | 3 | Invention Example |
| 8 | 6.0 | 3 | 2 | 2 | Comparative Example |
| 9 | 6.0 | 2 | 1 | 1 | Comparative Example |
| 10 | 2.0 | 4 | 4 | 3 | Invention Example |
| 11 | 1.0 | 4 | 4 | 3 | Invention Example |
| 12 | 5.5 | 2 | 1 | 1 | Comparative Example |
| 13 | 3.5 | 4 | 3 | 3 | Invention Example |
| 14 | 4.0 | 4 | 3 | 3 | Invention Example |
| 15 | 3.8 | 4 | 3 | 3 | Invention Example |
| 16 | 4.8 | 3 | 2 | 3 | Invention Example |
| 17 | 2.0 | 3 | 3 | 3 | Invention Example |
| 18 | 5.2 | 2 | 2 | 2 | Comparative Example |
| 19 | 0.3 | 4 | 4 | 3 | Invention Example |
| 20 | 0.5 | 4 | 4 | 3 | Invention Example |
| 21 | 1.0 | 3 | 3 | 3 | Invention Example |
| 22 | 1.0 | 4 | 4 | 3 | Invention Example |
| 23 | 4.0 | 4 | 3 | 3 | Invention Example |
| 24 | 7.0 | 2 | 1 | 1 | Comparative Example |
| 25 | 7.5 | 1 | 1 | 1 | Comparative Example |
| 26 | 0.5 | 4 | 4 | 3 | Invention Example |
| 27 | 6.3 | 1 | 1 | 1 | Comparative Example |
| 28 | 7.2 | 2 | 2 | 1 | Comparative Example |
| 29 | 2.0 | 4 | 4 | 3 | Invention Example |
| 30 | 4.0 | 4 | 4 | 3 | Invention Example |
| 31 | 5.8 | 2 | 2 | 1 | Comparative Example |
| 32 | 6.0 | 2 | 2 | 1 | Comparative Example |
| 33 | 2.0 | 4 | 4 | 3 | Invention Example |
| 34 | 3.0 | 3 | 3 | 3 | Invention Example |
| 35 | 5.5 | 2 | 2 | 2 | Comparative Example |
| 36 | 3.8 | 3 | 3 | 3 | Invention Example |
| 37 | 4.3 | 3 | 3 | 3 | Invention Example |
| 38 | 4.0 | 3 | 3 | 3 | Invention Example |
| 39 | 4.5 | 3 | 3 | 3 | Invention Example |
| 40 | 2.2 | 3 | 3 | 3 | Invention Example |
| 41 | 5.2 | 3 | 2 | 2 | Comparative Example |
| 42 | 0.8 | 4 | 4 | 3 | Invention Example |
| 43 | 0.5 | 4 | 4 | 3 | Invention Example |
| 44 | 2.3 | 3 | 3 | 3 | Invention Example |
| 45 | 2.0 | 4 | 4 | 3 | Invention Example |
| 46 | 3.2 | 4 | 3 | 3 | Invention Example |
| 47 | 6.0 | 2 | 1 | 1 | Comparative Example |
| 48 | 7.2 | 1 | 1 | 1 | Comparative Example |

TABLE 9

| Test No. | Average bubble height (average value of three bubbles with higher heights among bubbles) (μm) | Film peeling test | DRD can ERV | DRD can corrosion resistance | Classification of Invention Example and Comparative Example |
|---|---|---|---|---|---|
| 49 | 1.2 | 4 | 4 | 3 | Invention Example |
| 50 | 2.8 | 4 | 4 | 3 | Invention Example |
| 51 | 6.6 | 1 | 1 | 1 | Comparative Example |
| 52 | 6.1 | 1 | 1 | 1 | Comparative Example |
| 53 | 2.7 | 4 | 4 | 3 | Invention Example |
| 54 | 2.9 | 4 | 4 | 3 | Invention Example |
| 55 | 5.3 | 2 | 2 | 2 | Comparative Example |
| 56 | 5.5 | 2 | 2 | 2 | Comparative Example |
| 57 | 2.0 | 4 | 4 | 3 | Invention Example |
| 58 | 3.0 | 3 | 3 | 3 | Invention Example |
| 59 | 5.6 | 2 | 2 | 2 | Comparative Example |
| 60 | 3.7 | 3 | 3 | 3 | Invention Example |
| 61 | 4.4 | 3 | 2 | 3 | Invention Example |
| 62 | 4.5 | 3 | 3 | 3 | Invention Example |
| 63 | 4.8 | 3 | 3 | 3 | Invention Example |

TABLE 9-continued

| Test No. | Average bubble height (average value of three bubbles with higher heights among bubbles) (μm) | Film peeling test | DRD can ERV | DRD can corrosion resistance | Classification of Invention Example and Comparative Example |
|---|---|---|---|---|---|
| 64 | 2.8 | 3 | 3 | 3 | Invention Example |
| 65 | 5.2 | 3 | 2 | 2 | Comparative Example |
| 66 | 0.3 | 4 | 4 | 3 | Invention Example |
| 67 | 0.3 | 4 | 4 | 3 | Invention Example |
| 68 | 0.8 | 3 | 3 | 3 | Invention Example |
| 69 | 0.5 | 4 | 4 | 3 | Invention Example |
| 70 | 3.3 | 4 | 3 | 3 | Invention Example |
| 71 | 5.8 | 1 | 1 | 1 | Comparative Example |
| 72 | 7.0 | 1 | 1 | 1 | Comparative Example |
| 73 | 0.3 | 4 | 4 | 3 | Invention Example |
| 74 | 0.3 | 4 | 4 | 3 | Invention Example |
| 75 | 0.2 | 4 | 4 | 3 | Invention Example |
| 76 | 0.4 | 4 | 4 | 3 | Invention Example |
| 77 | 3.0 | 3 | 3 | 3 | Invention Example |
| 78 | 5.3 | 3 | 2 | 2 | Comparative Example |
| 79 | 3.5 | 3 | 3 | 3 | Invention Example |
| 80 | 5.6 | 2 | 2 | 2 | Comparative Example |
| 81 | 7.1 | 1 | 1 | 1 | Comparative Example |
| 82 | 2.7 | 4 | 4 | 3 | Invention Example |
| 83 | 2.3 | 4 | 4 | 3 | Invention Example |
| 84 | 3.0 | 4 | 4 | 3 | Invention Example |
| 85 | 6.2 | 1 | 1 | 1 | Comparative Example |
| 86 | 3.8 | 3 | 3 | 3 | Invention Example |
| 87 | 5.2 | 3 | 2 | 2 | Comparative Example |
| 88 | 4.0 | 3 | 3 | 3 | Invention Example |
| 89 | 6.0 | 2 | 1 | 1 | Comparative Example |
| 90 | 6.5 | 1 | 1 | 1 | Comparative Example |
| 91 | 3.0 | 4 | 4 | 3 | Invention Example |
| 92 | 3.2 | 4 | 4 | 3 | Invention Example |
| 93 | 2.9 | 4 | 4 | 3 | Invention Example |
| 94 | 5.5 | 1 | 1 | 3 | Comparative Example |
| 95 | 3.0 | 3 | 3 | 3 | Invention Example |
| 96 | 5.6 | 1 | 1 | 3 | Comparative Example |
| 97 | 4.2 | 3 | 3 | 3 | Invention Example |
| 98 | 5.8 | 2 | 1 | 3 | Comparative Example |
| 99 | 6.3 | 1 | 1 | 3 | Comparative Example |

As is apparent from the examples and comparative examples, the film-laminated metal plate of the present invention has very few harmful bubbles which adversely affect the film adhesiveness and corrosion resistance after canning between the metal plate and the film, and has excellent retort adhesiveness and corrosion resistance.

INDUSTRIAL APPLICABILITY

The film-laminated metal plate according to this embodiment has a small average bubble height in film, a small film peeling length after a retort treatment, improves adhesiveness, can significantly reduce corrosion caused by bubbles, and is thus extremely useful as a film-laminated metal plate for a food container.

BRIEF DESCRIPTION OF THE REFERENCE SYMBOLS

1: metal plate
3: bubble
5: resin film
10: film-laminated metal plate
20: film laminate roll
30: cooling tank
40: first roll
50: second roll
60: third roll
70: fourth roll

The invention claimed is:

1. A method of manufacturing a film-laminated metal plate having excellent retort adhesiveness, the method comprising:
    pressure bonding a resin film against a metal plate heated to a temperature at or above a melting point of the resin film, the pressure bonding performed with a film laminate roll, the pressure bonding forming an intermediate film-laminated metal plate;
    cooling the intermediate film-laminated metal plate to a temperature range of equal to or higher than a glass transition temperature Tg of the resin film and lower than a crystallization temperature Tc of the resin film, the cooling starting within 2.0 seconds after the pressure bonding; and
    in the temperature range, winding the intermediate film-laminated metal plate over at least three rolls in a length range of 20% to 55% in terms of roll circumferential length ratio for each roll of the at least three rolls, and passing the intermediate film-laminated metal plate over the at least three rolls at a passing tension of of 20 to 60 N/mm² to form the film-laminated metal plate.

2. The method for manufacturing the film-laminated metal plate having excellent retort adhesiveness according to claim 1,
    wherein the passing tension is 40 to 60 N/mm².

3. The method for manufacturing the film-laminated metal plate having excellent retort adhesiveness according to claim 1, wherein at least one of the at least three rolls has a diameter ranging from 200 to 600 mm.

4. The method for manufacturing the film-laminated metal plate having excellent retort adhesiveness according to claim 2,
wherein at least one of the at least three rolls has a diameter ranging from 200 to 600 mm.

\* \* \* \* \*